United States Patent
Kojima

(10) Patent No.: US 8,750,893 B2
(45) Date of Patent: Jun. 10, 2014

(54) MOBILE COMMUNICATION SYSTEM AND POSITION DETECTION METHOD

(75) Inventor: Yuji Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 860 days.

(21) Appl. No.: 12/487,951

(22) Filed: Jun. 19, 2009

(65) Prior Publication Data

US 2010/0056177 A1    Mar. 4, 2010

(30) Foreign Application Priority Data

Sep. 2, 2008  (JP) .................................. 2008-225306

(51) Int. Cl.
*H04W 36/00* (2009.01)

(52) U.S. Cl.
USPC ................ 455/456.1; 455/404.2; 455/456.2; 455/456.3; 455/456.4; 455/456.5; 455/456.6; 455/435.1; 455/435.2; 455/436

(58) Field of Classification Search
USPC .......... 455/404.2, 456.1–456.6, 435.1, 435.2, 455/436–440, 442, 444
See application file for complete search history.

(56) References Cited

U.S. PATENT DOCUMENTS

| | | | |
|---|---|---|---|
| 6,134,448 A | 10/2000 | Shoji et al. | |
| 6,212,382 B1 * | 4/2001 | Watson et al. | 455/444 |
| 6,671,514 B1 | 12/2003 | Cedervall et al. | |
| 7,145,890 B1 | 12/2006 | Seo et al. | |
| 7,826,847 B1 * | 11/2010 | Roskowski et al. | 455/436 |
| 7,929,970 B1 * | 4/2011 | Gunasekara et al. | 455/437 |
| 2003/0040323 A1 * | 2/2003 | Pihl et al. | 455/456 |
| 2007/0066334 A1 | 3/2007 | Butts et al. | |

FOREIGN PATENT DOCUMENTS

| | | |
|---|---|---|
| JP | 10-509845 | 9/1998 |
| JP | 2003-506960 | 2/2003 |
| JP | 2003-520532 | 7/2003 |
| JP | 2004-301850 | 10/2004 |
| JP | 2004-312058 | 11/2004 |
| JP | 2007-506308 | 3/2007 |
| WO | 97/33386 | 9/1997 |
| WO | 2007/103062 | 9/2007 |
| WO | 2008/093103 | 8/2008 |

OTHER PUBLICATIONS

Notice of Rejection issued for corresponding Japanese Patent Application No. 2008-225306, mailed Nov. 13, 2012, with English translation.

* cited by examiner

*Primary Examiner* — Rafael Pérez-Gutiérrez
*Assistant Examiner* — Thai Vu
(74) *Attorney, Agent, or Firm* — Myers Wolin, LLC

(57) ABSTRACT

A mobile communication system includes a first base station and one or more base stations whose information is included in adjacent-base-station information notified by the first base station. The mobile communication system includes a transmitting unit that transmits information on one or more base stations whose information is not included in the adjacent-base-station information to a mobile station, and a position detecting unit that, by using the one or more base stations whose information is not included in the adjacent-base-station information, detects a position of the mobile station.

6 Claims, 16 Drawing Sheets

| MACRO BASE STATION | AREA | FEMTO BASE STATION | DISTANCE | START ANGLE | END ANGLE |
|---|---|---|---|---|---|
| 30 | a | 40-1 | L1 | Rad1 | Rad2 |
| | b | 40-2 | L1 | Rad2 | Rad3 |
| | c | 40-3, 40-4 | L1 | Rad3 | Rad1 |
| ⋮ | | | | | | ered. However, suffi-
MOBILE COMMUNICATION SYSTEM AND POSITION DETECTION METHOD

CROSS-REFERENCE TO RELATED APPLICATION(S)

This application is based upon and claims the benefit of priority of the prior Japanese Patent Application No. 2008-225306, filed on Sep. 2, 2008, the entire contents of which are incorporated herein by reference.

FIELD

The present invention relates to a mobile communication system and a position detection method.

BACKGROUND

As an example of mobile communication systems, in recent years, the Institute of Electrical and Electronics Engineers (IEEE) works toward the standardization of wireless communication systems called Worldwide Interoperability for Microwave Access (WiMAX). WiMAX has two standards. One is IEEE 802.16d for fixed subscriber stations, and the other is IEEE 802.16e for mobile subscriber stations (hereinafter, "mobile stations"). The standardization of IEEE 802.16m, which is the next generation of IEEE 802.16e, is also in progress.

Mobile stations based on IEEE 802.16e or the like perform wireless communication with a macro base station operating in a wired network called an access service network (ASN). The macro base station performs wireless communication with mobile stations within a range (hereinafter, "macro cell") where radio waves transmitted from the macro base station are received. Various methods for detecting the position of a mobile station have been studied for a wireless communication system in which wired base stations such as macro base stations operate. Specifically, for example, the position of the mobile station can be detected based on transmission delays and the power loss of signals transmitted between the base station and the mobile station. According to the methods, a mobile station performs signal transmission/reception with a plurality of base stations, and the position of the mobile station is calculated based on, for example, the coordinates of each of the base stations and transmission delays of signals. Published Japanese Translation of PCT Application No. 2003-520532 and Japanese Laid-open Patent Publication No. 2004-301850 disclose technologies for measuring the radio wave environment between the mobile station and the base stations, and calculating the position of the mobile station based on the measurement result.

The IEEE 802.16e defines that a macro base station broadcasts a message (MOB_NBR-ADV: mobile neighbor advertisement) that includes information on adjacent macro base stations. Accordingly, the mobile station may receive the message from the macro base station to determine one or more macro base stations to/from which signals can be transmitted/received. The first macro base station, which is in communication with the mobile station, and the other macro base station which is adjacent to the first macro base station may perform signal transmission/reception with the mobile station to detect the position of the mobile station.

A macro base station is generally large and installed outdoors, and a macro cell is also relatively large. Accordingly, if the macro base station is installed, wireless communication can be performed in a relatively wide range. However, sufficient communication quality cannot be obtained inside a building and the like where radio waves are hard to reach.

Accordingly, in the WiMAX, an introduction of a femto base station that is smaller than the macro base station has been investigated. The femto base station is mainly installed inside a building such as a house, and although a range (hereinafter, "femto cell") in which transmitted radio waves can reach is relatively narrow, it is possible to provide wireless communication service to mobile stations.

As described earlier, the macro base station broadcasts information related to adjacent macro base stations. The broadcasted information (hereinafter, "adjacent-station information"), however, does not include information on femto base stations. Accordingly, the mobile station cannot easily identify a femto base station to/from which signals can be transmitted/received. Consequently, it is difficult to use a femto base station to detect the position of the mobile station.

SUMMARY

According to one aspect of the invention, in a mobile communication system that includes a first base station and one or more base stations whose information is included in adjacent-base-station information notified by the first base station, the mobile communication system includes a transmitting unit that transmits information on one or more base stations whose information is not included in the adjacent-base-station information to a mobile station, and a position detecting unit that, by using the one or more base stations whose information is not included in the adjacent-base-station information, detects a position of the mobile station.

According to another aspect of the invention, a method for detecting a position of a mobile station in a mobile communication system that includes a first base station and one or more base stations whose information is included in adjacent-base-station information notified by the first base station, the method includes transmitting information on one or more base stations whose information is not included in the adjacent-base-station information to the mobile station, receiving the information on the one or more base stations whose information is not included in the adjacent-base-station information by the mobile station, and detecting a position of the mobile station, by using the one or more base stations whose information is not included in the adjacent-base-station information.

According to still another aspect of the invention, for detecting a position of a mobile station in a radio wave transmission range of a first base station, a second base station whose radio wave transmission range encompasses the mobile station in the radio wave transmission range of the first base station is selected. The second base station is installed within the radio wave transmission range of the first base station, and has a radio wave transmission range narrower than the radio wave transmission range of the first base station. Information of the second base station is not included in adjacent-base-station information transmitted by the first base station. Further, a measurement result of a wireless environment is acquired. The measurement result is obtained by communication between the second base station selected at the selecting and the mobile station. Further, the position of the mobile station is calculated based on the acquired measurement result.

The object and advantages of the invention will be realized and attained by means of the elements and combinations particularly pointed out in the claims.

BRIEF DESCRIPTION OF DRAWING(S)

DESCRIPTION OF EMBODIMENT(S)

Figure 1:
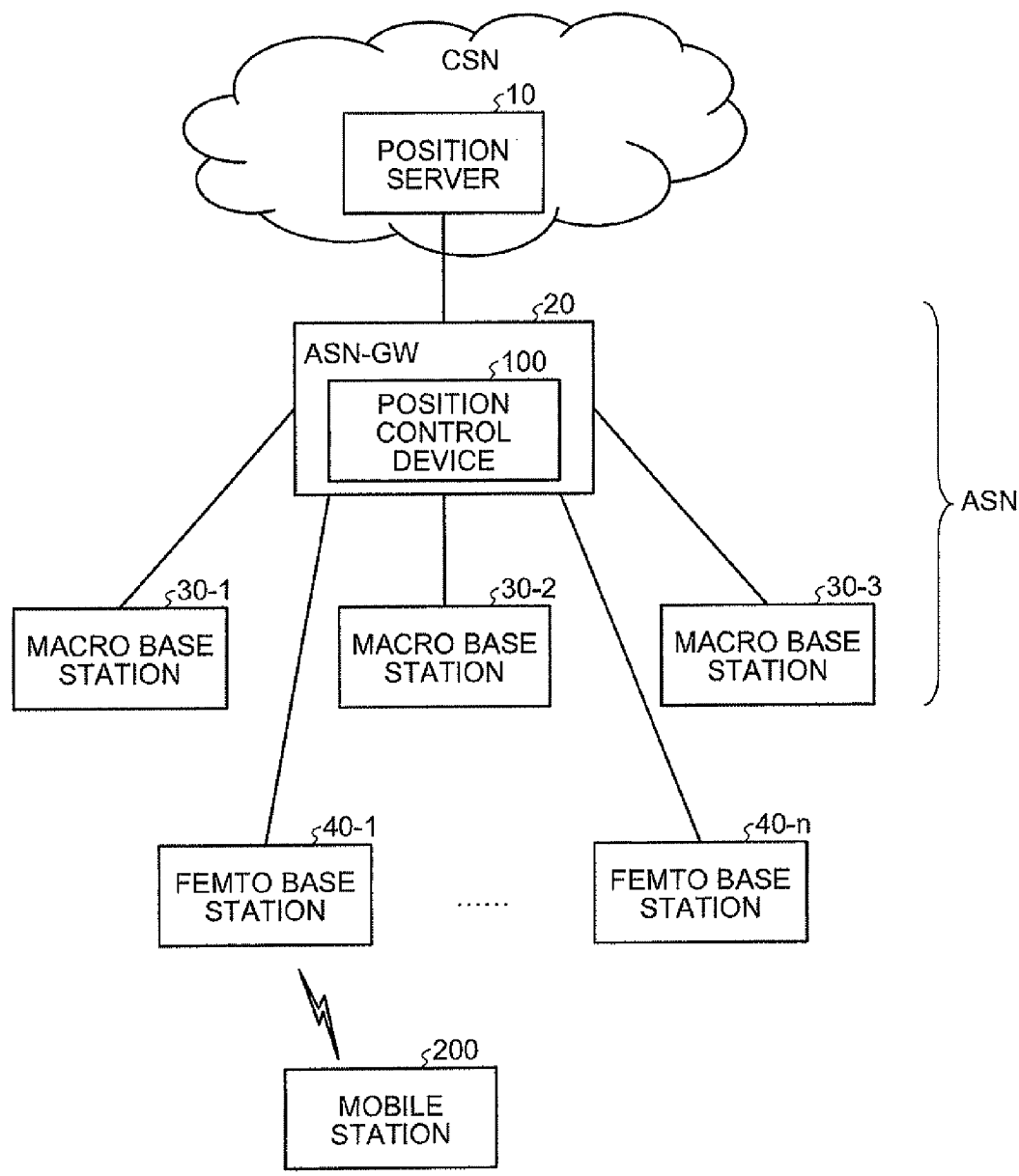
FIG. 1 is a schematic of a communication system according to a first embodiment of the present invention.

Exemplary embodiments of the present invention are described below in greater detail with reference to the accompanying drawings.

In the embodiments described below, a first base station group and a second station group are present.

In the embodiments, the first base station group includes at least one base station A and a plurality of base stations adjacent to the base station A. The base station A notifies (i.e., transmits) information on the adjacent base stations (i.e., adjacent-base-station information). However, even if the second base station group is present at the position adjacent to the base station A, information (such as parameters used when a mobile station performs wireless communication with a base station included in the second base station group; communication frequency, timing, base station identification information, and the like are examples of the parameters) on the second base station group is not included in the adjacent-base-station information.

Accordingly, the mobile station does not acquire information on the second base station group on receiving the adjacent-base-station information notified from the base station A.

The mobile station, however, receive information on one or more base stations included in the second base station group separately (or more preferably, individually) from the base station A, and perform wireless communication with the one or more base stations included in the second base station group, whereby the position of the mobile station is detected. The base station A operates as a transmitting unit that transmits information on the one or more base stations included in the second base station group. The base station A may be a serving base station of the mobile station.

If a wireless area of a cell formed by the second base station group is smaller than that of a cell formed by the first base station group, the position detection accuracy can further be improved. However, the present invention is not limited to such embodiment.

The one or more base stations included in the second base station group may be selected, based on position information of the mobile station, from those positioned within a predetermined area with reference to a position indicated by the position information of the mobile station. In this case, the position information of the mobile station can be measured by the first base station group, and may be of low accuracy.

Alternatively, the position of the mobile station can be detected without relying on the position information of the mobile station. One or more base station may be selected from the second base station group; the mobile station tries to perform wireless communication with the selected base station(s); if the mobile station cannot establish the wireless communication with the selected base station(s), other base station(s) are selected; and the mobile station tries to perform wireless communication with the newly selected base station (s) again. This procedure is repeated until the mobile station succeeds in wireless communication. The position of the mobile station is detected based on a measurement result obtained when the wireless communication succeeds.

In the following, an example of a communication system that employs WiMAX will be described. However, the present invention is applicable to a communication system that employs a wireless communication system other than the WiMAX. In the following example, a macro base station is used as the first base station group, and a femto base station is used as the second base station group. In the following example, a rough position is detected before the position of a mobile station is detected. However, as described above, the present invention is not limited to such embodiment.

[a] First Embodiment

FIG. 1 is a schematic of a communication system according to a first embodiment of the present invention. As depicted in FIG. 1, the communication system according to the first embodiment includes a connectivity service network (CSN) and an access service network (ASN). The CSN provides an interconnection function with a network such as the Internet. The ASN provides a wide range wireless communication function. The CSN includes a position server 10, and the position server 10 is connected to an ASN gateway (ASN-GW) 20 operating in the ASN.

The position server 10 outputs rough position information that indicates a rough position of a mobile station 200 to a position control device 100 in the ASN-GW 20. The rough position information is acquired from position detection result obtained by a position detection method similar to that of the conventional methods, for example, by acquiring the position of a macro cell of a macro base station in communication with the mobile station 200, and by acquiring the propagation time and the propagation loss of wireless signals transmitted between the macro base station and the mobile station. The ASN-GW 20 includes the position control device 100, and connected to macro base stations 30-1 to 30-3, and femto base stations 40-1 to 40-n (n is an integer equal to or larger than one).

Figure 2:
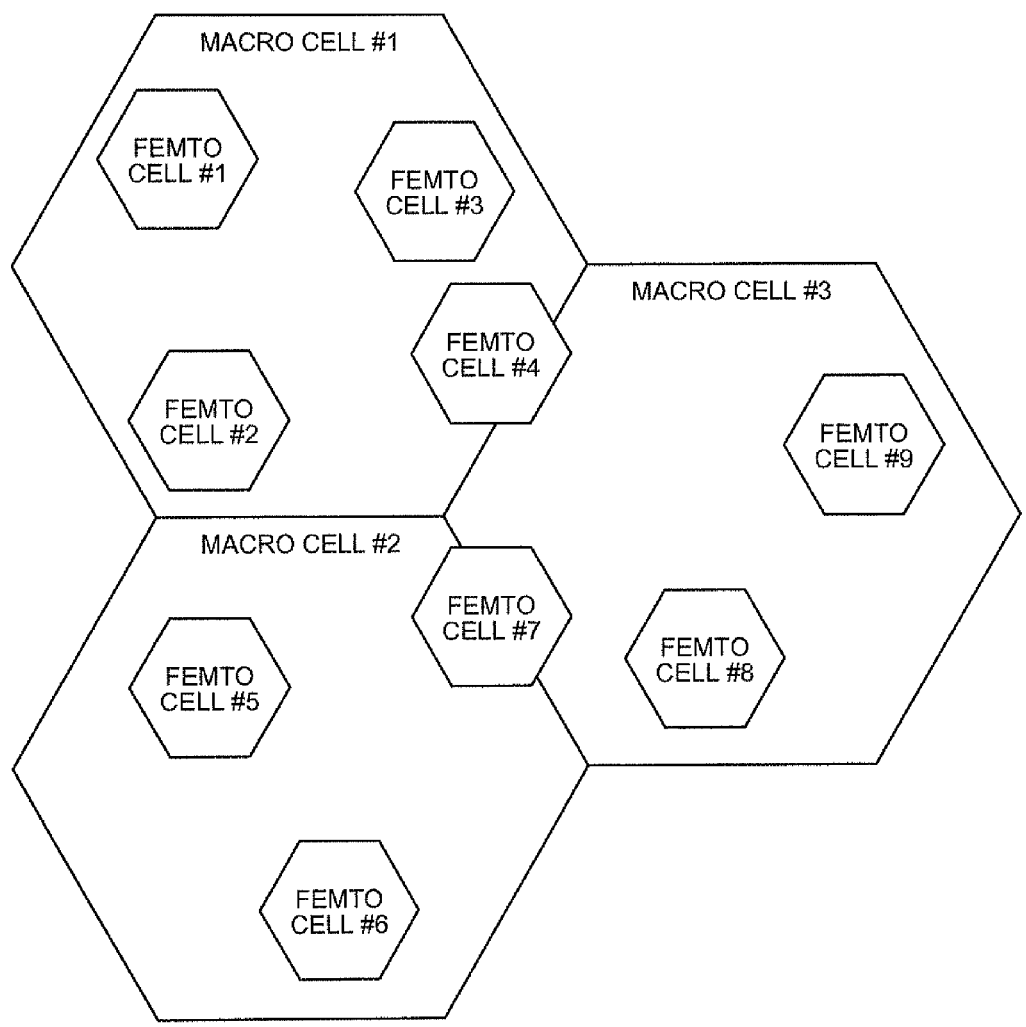
FIG. 2 is a schematic of a specific example of a cell structure according to the first embodiment.

The macro base stations 30-1 to 30-3 perform wireless communication with mobile stations in a macro cell. The femto base stations 40-1 to 40-n perform wireless communication with mobile stations in a femto cell. The structure of the macro cell and the femto cell, for example, is as illustrated in FIG. 2. In an example of FIG. 2, macro cells #1 to #3 are adjacent to each other, and the macro cells #1 to #3 include femto cells #1 to #9. At the center of each of the macro cells, a macro base station is installed. At the center of each of the femto cells, a femto base station is installed. Accordingly, the mobile stations in a femto cell can communicate with the femto cell base station, and also can communicate with the macro base station installed at the center of the macro cell including the femto cell.

The position control device 100, on receiving rough position information, selects a femto base station placed near the mobile station 200 from the femto base stations 40-1 to 40-n, and transmits a message including information on the selected femto base station to the mobile station 200. The position control device 100, based on the measured result of the radio wave intensity of a reference signal transmitted between the selected femto base station and the mobile station 200, detects a highly accurate position of the mobile station 200. A specific configuration and an operation of the position control device 100 will be described later.

The mobile station 200 performs wireless communication with the macro base stations 30-1 to 30-3 or the femto base stations 40-1 to 40-n. To detect the position of the mobile station 200, the mobile station 200 transmits/receives a reference signal to/from the femto base station. At this time, the mobile station 200 receives a message including information on the femto base station from the position control device 100. Using the received message, the mobile station 200 determines a femto base station that transmits/receives the reference signal. A specific configuration and an operation of the mobile station 200 will be described later.

Figure 3:
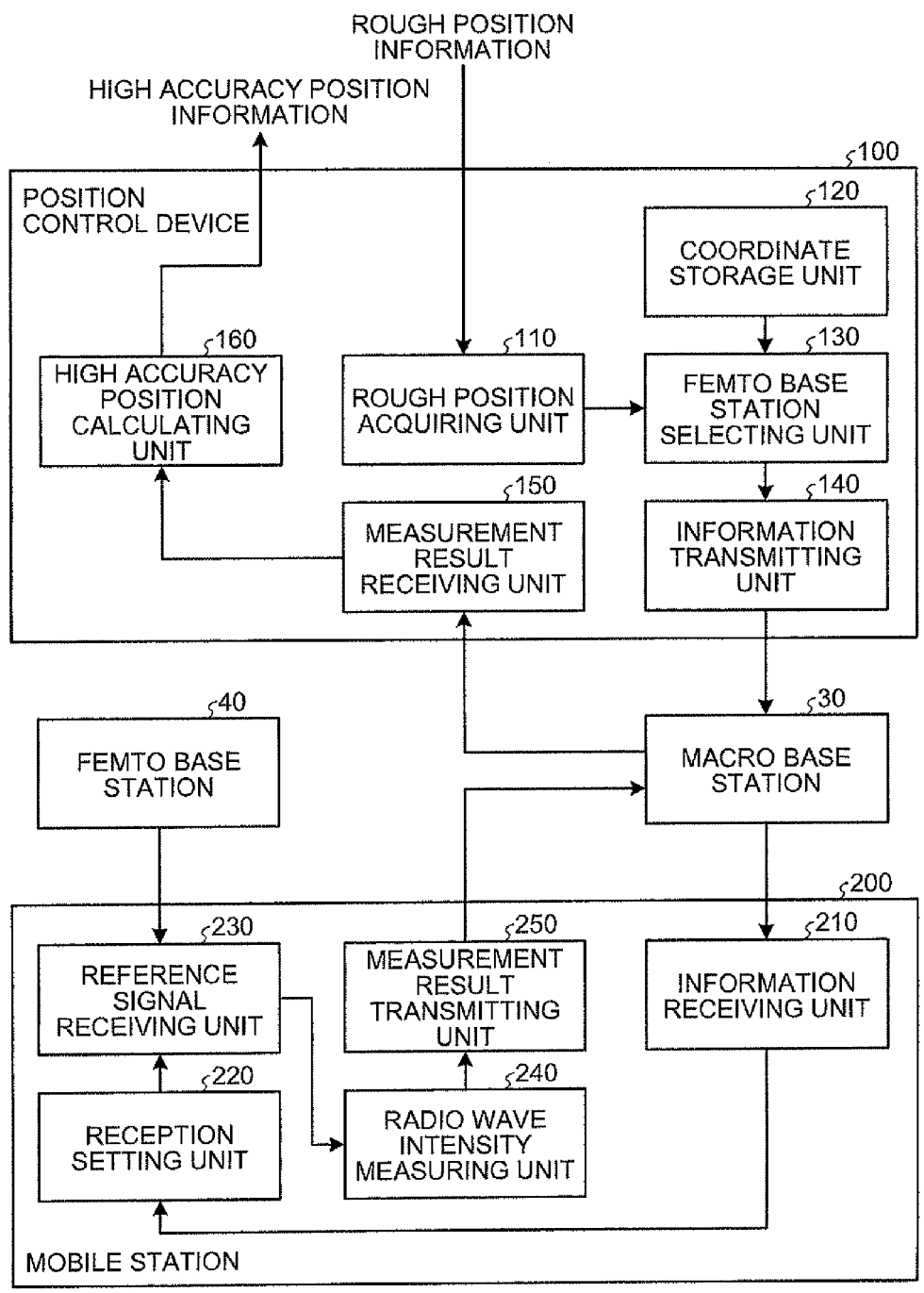
FIG. 3 is a block diagram of a main portion of a position detection system according to the first embodiment.

FIG. 3 is a block diagram of a main portion of a position detection system that includes the position control device 100 and the mobile station 200 according to the first embodiment. In the following, it is assumed that the mobile station 200 is in communication with a macro base station 30, and a femto base station 40 is placed near the mobile station 200. However, the present invention is not limited to such embodiment. For example, the mobile station 200 may be in communication with a femto base station other than the femto base station 40.

The position control device 100 depicted in FIG. 3 includes a rough position acquiring unit 110, a coordinate storage unit 120, a femto base station selecting unit 130, an information transmitting unit 140, a measurement result receiving unit 150, and a high accuracy position calculating unit 160.

The rough position acquiring unit 110 acquires rough position information that indicates an approximate position of the mobile station 200, from the position server 10 operating in the CSN. The rough position acquiring unit 110 then notifies the approximate position of the mobile station 200 to the femto base station selecting unit 130. Instead of acquiring the rough position information from the position server 10, the rough position acquiring unit 110 may calculate an approximate position of the mobile station 200, based on the transmission/reception of signals between the mobile station 200 and macro base stations including the macro base station 30.

Figures 4, 5:
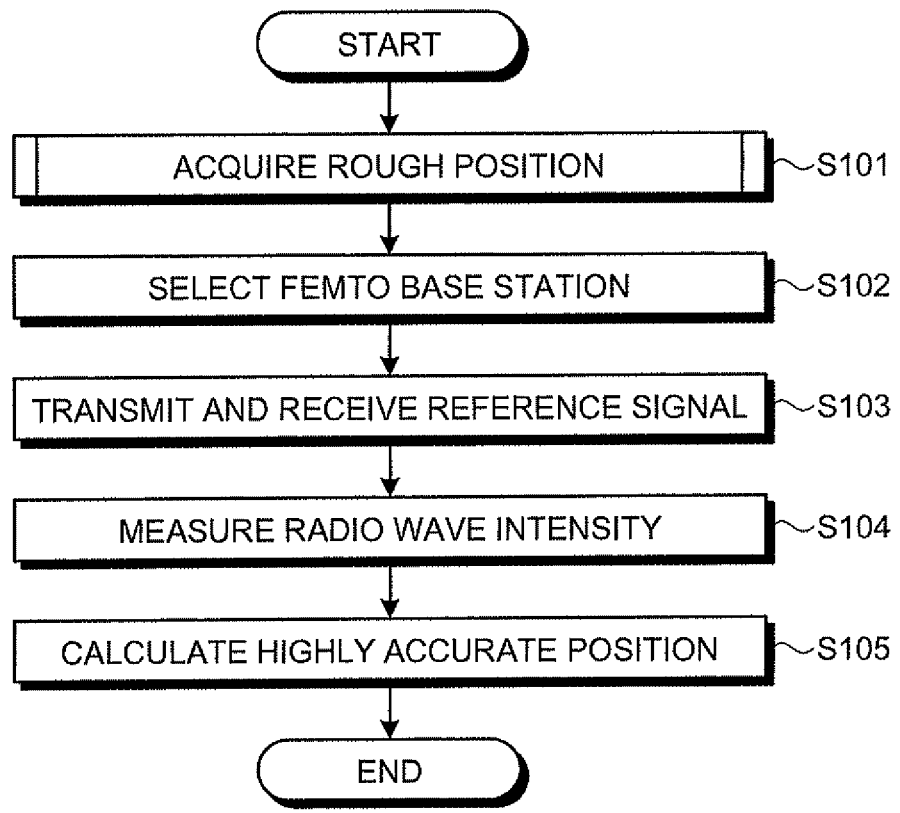
FIG. 4 is a schematic of a specific example of a coordinate storage unit according to the first embodiment.
FIG. 5 is a flowchart of a position detection method according to the first embodiment.

The coordinate storage unit 120 stores therein coordinates of all the femto base stations including the femto base station 40 in advance. Because the femto base station is sometimes owned by an individual, the position may not be fixed. However, the coordinate storage unit 120 stores therein the coordinates of the femto base station whose position is fixed. In other words, the coordinate storage unit 120, as illustrated in FIG. 4, for example, stores therein coordinates (x1, y1, z1) and (x2, y2, z2) of the femto base stations 40-1 and 40-2, respectively, whose positions are fixed, but does not store therein coordinates of a femto base station 40-3 whose position is not fixed.

The femto base station selecting unit 130 selects a femto base station placed near the mobile station 200, based on the approximate position of the mobile station 200 and the coordinates of the femto base station. At this time, the femto base station selecting unit 130 selects at least one femto base station. To improve the accuracy of position detection, the femto base station selecting unit 130 selects a plurality of femto base stations. The femto base station selecting unit 130 selects a femto base station installed in a range where communication with the mobile station 200 is possible. The femto base station selecting unit 130 is assumed to select the femto base station 40 in this example.

The information transmitting unit 140 transmits information on the femto base station 40 selected by the femto base station selecting unit 130 to the mobile station 200 via the macro base station 30. More specifically, the information transmitting unit 140 transmits a measurement request message including an identifier of the selected femto base station 40, a preamble index required for synchronization with the femto base station 40, a frequency of a reference signal transmitted from the femto base station 40, and the like. The measurement request message is delivered to the mobile station 200 via the macro base station 30 in communication with the mobile station 200.

The measurement result receiving unit 150, after the measurement request message is transmitted, receives the measurement result of the radio wave intensity of the reference signal transmitted from the femto base station 40, from the mobile station 200 via the macro base station 30. The measurement result receiving unit 150, if the mobile station 200 also measures the radio wave intensity of the reference signal transmitted from a femto base station other than the femto base station 40, also receives the measurement result. If the mobile station 200 measures the radio wave intensity of the reference signal transmitted from a macro base station, the measurement result receiving unit 150 also receives the measurement result. In other words, the measurement result receiving unit 150 acquires all the measurement results of the radio wave intensity of the reference signals received by the mobile station 200.

The high accuracy position calculating unit 160 calculates the precise position of the mobile station 200 based on the measurement result of the radio wave intensity acquired by the measurement result receiving unit 150. In other words, the high accuracy position calculating unit 160 calculates the position of the mobile station 200 by using the coordinates of the base station that is a transmission source of a reference signal and the measurement result of the radio wave intensity of the reference signal. At this time, the high accuracy position calculating unit 160 calculates the position of the mobile station 200, by using characteristics of the reference signal whose radio wave intensity decreases as the distance between the mobile station 200 and the base station, which is the transmission source of the reference signal, gets longer. Because the measurement result related to the reference signal of the femto base station 40 having a relatively narrow transmission range is used, the high accuracy position calculating unit 160 can calculate the highly accurate position of the mobile station 200.

The mobile station 200 depicted in FIG. 3 includes an information receiving unit 210, a reception setting unit 220, a reference signal receiving unit 230, a radio wave intensity measuring unit 240, and a measurement result transmitting unit 250.

The information receiving unit 210 receives information on the femto base station 40 from the position control device 100 via the macro base station 30. More specifically, the information receiving unit 210 receives a measurement request message including an identifier of the femto base station 40, a preamble index required for synchronization with the femto base station 40, and a frequency of the reference signal transmitted by the femto base station 40, for example.

The reception setting unit 220, when the information receiving unit 210 receives the measurement request message, performs reception setting so that a reference signal transmitted from the femto base station 40 can be received. More specifically, the reception setting unit 220 establishes synchronization with the femto base station 40, and sets a reception frequency of the reference signal receiving unit 230 to the frequency of the reference signal transmitted from the femto base station 40, for example.

The reference signal receiving unit 230 receives the reference signal transmitted from the femto base station 40. The reference signal here is a known signal in the base station and the mobile station 200, and is a signal periodically transmitted from the base station such as the femto base station 40. As a specific reference signal, for example, a preamble may be used. In other words, a preamble attached to the head of a wireless frame transmitted from the femto base station 40 may be used as the reference signal, for example. As a specific reference signal, a pilot signal included in a frame may be used, for example.

The radio wave intensity measuring unit 240 measures the radio wave intensity of the reference signal received by the reference signal receiving unit 230. The radio wave intensity measuring unit 240 then outputs the measurement result of the radio wave intensity to the measurement result transmitting unit 250.

The measurement result transmitting unit 250 transmits the measurement result of the radio wave intensity output from the radio wave intensity measuring unit 240 to the position control device 100 via the macro base station 30. In other words, the measurement result transmitting unit 250 transmits the measurement result to the macro base station 30 with which the mobile station is in communication, and transfers the measurement result to the position control device 100 from the macro base station 30.

A procedure of a position detection method performed by the mobile station 200 in the position detection system formed as above will now be described with reference to FIG. 5.

The rough position acquiring unit 110 of the position control device 100 acquires a rough position of the mobile station 200 (Step S101). The rough position acquiring unit 110 may acquire the rough position information stored in the position server 10 operating in the CSN in advance, or the rough position acquiring unit 110 may acquire the position detection result based on the transmission/reception of signals between the macro base station and the mobile station 200. Note that, a femto base station is not used for detecting the position of the mobile station 200 at this point.

When the rough position is acquired by the rough position acquiring unit 110, the approximate position of the mobile station 200 is identified. Accordingly, the femto base station selecting unit 130 selects a femto base station placed near the mobile station 200 (Step S102). In other words, the femto base station selecting unit 130 selects a femto base station installed near the approximate position of the mobile station 200, among the femto base stations whose coordinates are stored in the coordinate storage unit 120. It is assumed here that the femto base station 40 is selected.

The measurement request message including an identifier of the femto base station 40, and a parameter required for the reception of the reference signal transmitted from the femto base station 40 is transmitted to the mobile station 200 from the information transmitting unit 140. Because the measurement request message is transmitted from the position control device 100 in this manner, the mobile station 200 can acquire the information on the femto base station 40 to be used for detecting the position, from the measurement request message. Because the measurement request message is transmitted only to the mobile station 200 whose position is an object to be detected, it is possible to prevent unnecessary consumption of wireless resources.

The information receiving unit 210 of the mobile station 200 receives the measurement request message transmitted from the position control device 100, and the reception setting unit 220 performs reception setting so that a reference signal from the femto base station 40 can be received. Accordingly, the reference signal transmitted from the femto base station 40 is received by the reference signal receiving unit 230 of the mobile station 200 (Step S103).

When the reference signal receiving unit 230 receives the reference signal, the radio wave intensity measuring unit 240 measures the radio wave intensity of the reference signal (Step S104), and the measurement result is transmitted from the measurement result transmitting unit 250. The measurement result receiving unit 150 of the position control device 100 then receives the measurement result of the radio wave intensity, and the high accuracy position calculating unit 160 calculates the position of the mobile station 200 based on the measurement result of the radio wave intensity (Step S105). The position of the mobile station 200 calculated here is calculated based on the measurement result of the radio wave intensity of the reference signal transmitted from the femto base station 40. Consequently, accuracy of the position is higher than a position calculated based only on the transmission/reception of signals between the macro base station and the mobile station 200.

Three different types of rough position acquiring process performed in the rough position acquiring unit 110 will be described with reference to FIGS. 6 to 8. In the rough position acquiring process, as a result of communication between the macro base station and the mobile station 200, a rough position of the mobile station 200 is acquired by the rough position acquiring unit 110 of the position control device 100.

Figure 6:
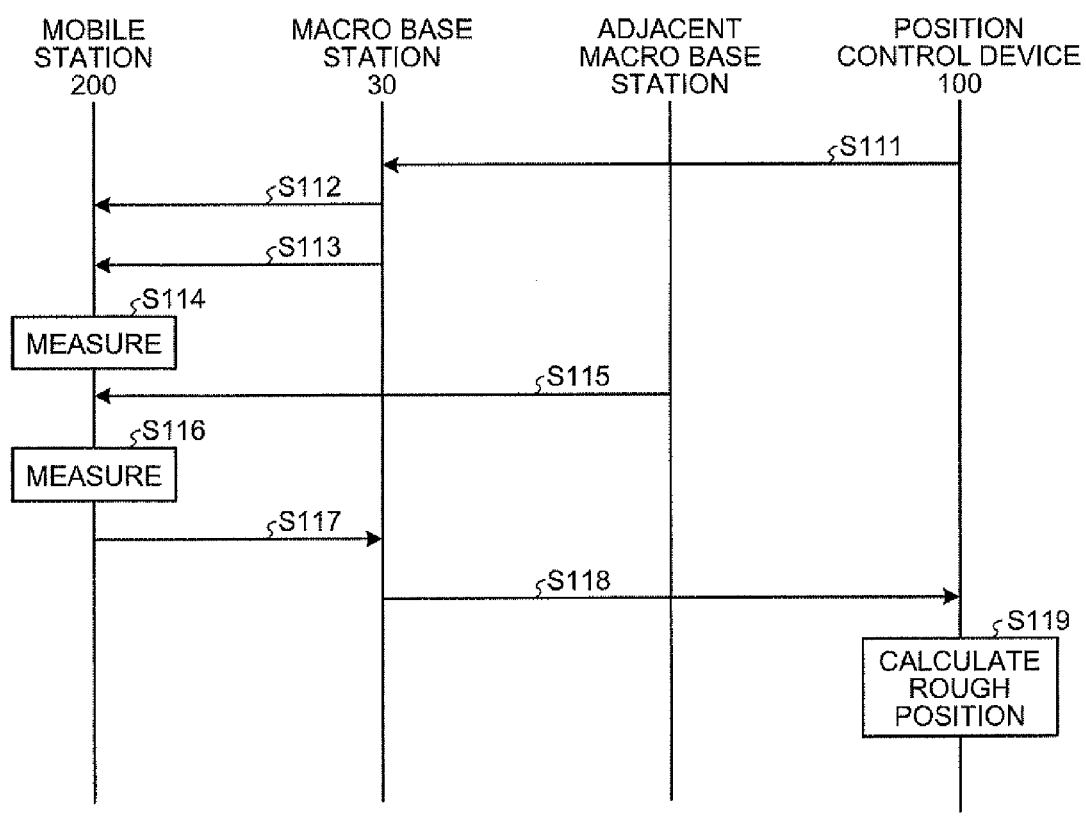
FIG. 6 is a sequence diagram of a rough position acquiring process.

In the process of the first type illustrated in FIG. 6, the mobile station 200 measures the radio wave intensity of the reference signals transmitted from the macro base stations, and the rough position acquiring unit 110 calculates a rough position of the mobile station 200, based on the measurement result.

As illustrated in FIG. 6, when the rough position acquiring unit 110 transmits a rough position measurement request to the macro base station 30 with which the mobile station 200 is in communication (Step S111), the macro base station 30 transmits a message to notify an identifier of an adjacent macro base station placed adjacent to the macro base station 30, to the mobile station 200 (Step S112).

The transmitted message is received by the mobile station 200, and the mobile station 200 identifies the adjacent macro base station of the macro base station 30. The mobile station 200 then receives a known reference signal transmitted from the macro base station 30 (Step S113), and measures the radio wave intensity of the known reference signal (Step S114). The mobile station 200 also receives a known reference signal transmitted from the adjacent macro base station (Step S115), and measures the radio wave intensity of the known reference signal (Step S116). The measurement results of the radio wave intensities are transmitted to the position control device 100 via the macro base station 30 (Steps S117 and S118).

The transmitted measurement results of the radio wave intensities are acquired by the rough position acquiring unit 110 of the position control device 100, and a rough position of the mobile station 200 is calculated from the acquired measurement results (Step S119).

Figure 7:
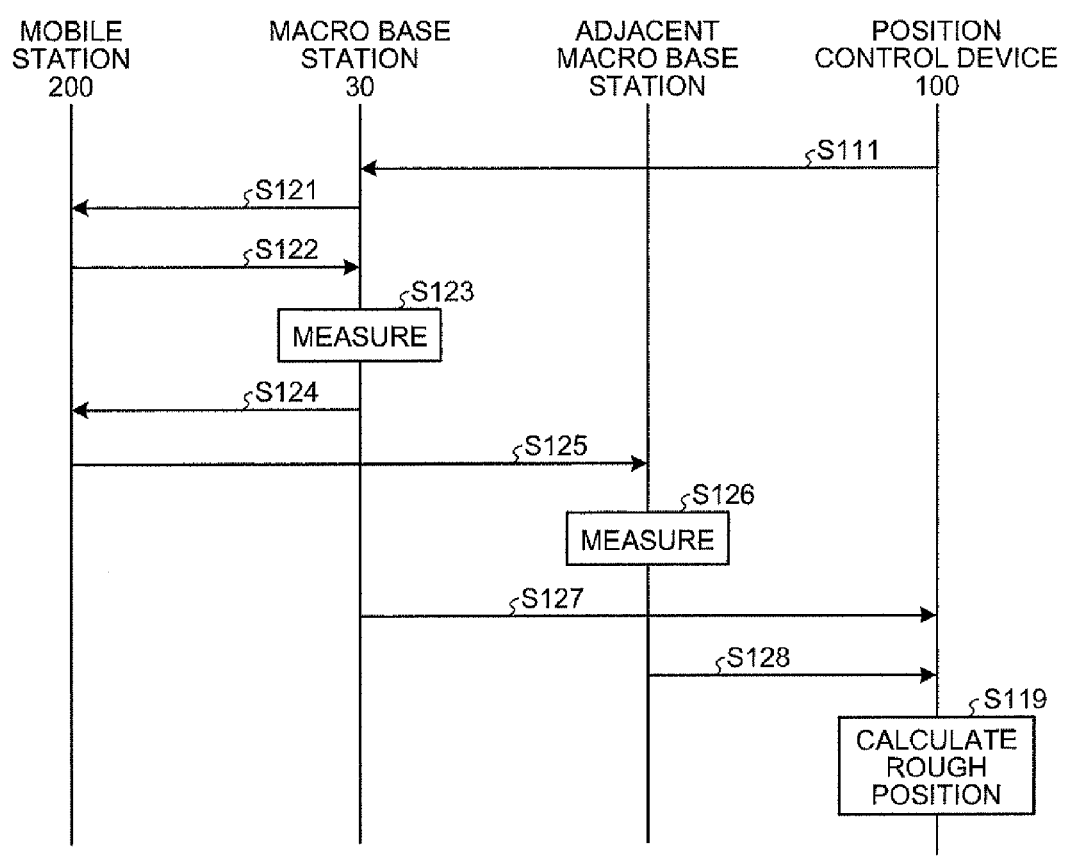
FIG. 7 is a sequence diagram of an alternative rough position acquiring process.

In the process of the second type illustrated in FIG. 7, the macro base stations measure the radio wave intensity of the reference signal transmitted from the mobile station 200, and the rough position acquiring unit 110 calculates a rough position of the mobile station 200, based on the measurement result. In FIG. 7, the same portions as those in FIG. 6 are denoted by the same reference numerals.

As illustrated in FIG. 7, when the rough position acquiring unit 110 transmits a rough position measurement request to the macro base station 30 with which the mobile station 200 is in communication (Step S111), the macro base station 30 transmits a message to instruct the mobile station 200 to transmit a reference signal (Step S121). The transmitted message is received by the mobile station 200, and the mobile station 200 then transmits a known reference signal to the macro base station 30 (Step S122). The macro base station 30 receives the reference signal, and measures the radio wave intensity (Step S123).

The macro base station 30 then transmits a message to instruct the mobile station 200 to transmit a reference signal to the adjacent macro base station (Step S124). The transmitted message is received by the mobile station 200, and the mobile station 200 then transmits a known reference signal to the adjacent macro base station (Step S125). The adjacent macro base station receives the reference signal, and measures the radio wave intensity (Step S126).

The measurement result of the radio wave intensity measured by the macro base station 30 is transmitted to the position control device 100 (Step S127), and the measurement result of the radio wave intensity measured by the adjacent macro base station is transmitted to the position control device 100 (Step S128). The transmitted measurement results of the radio wave intensities are acquired by the rough position acquiring unit 110 of the position control device 100, and a rough position of the mobile station 200 is calculated from the acquired measurement results (Step S119).

Figure 8:
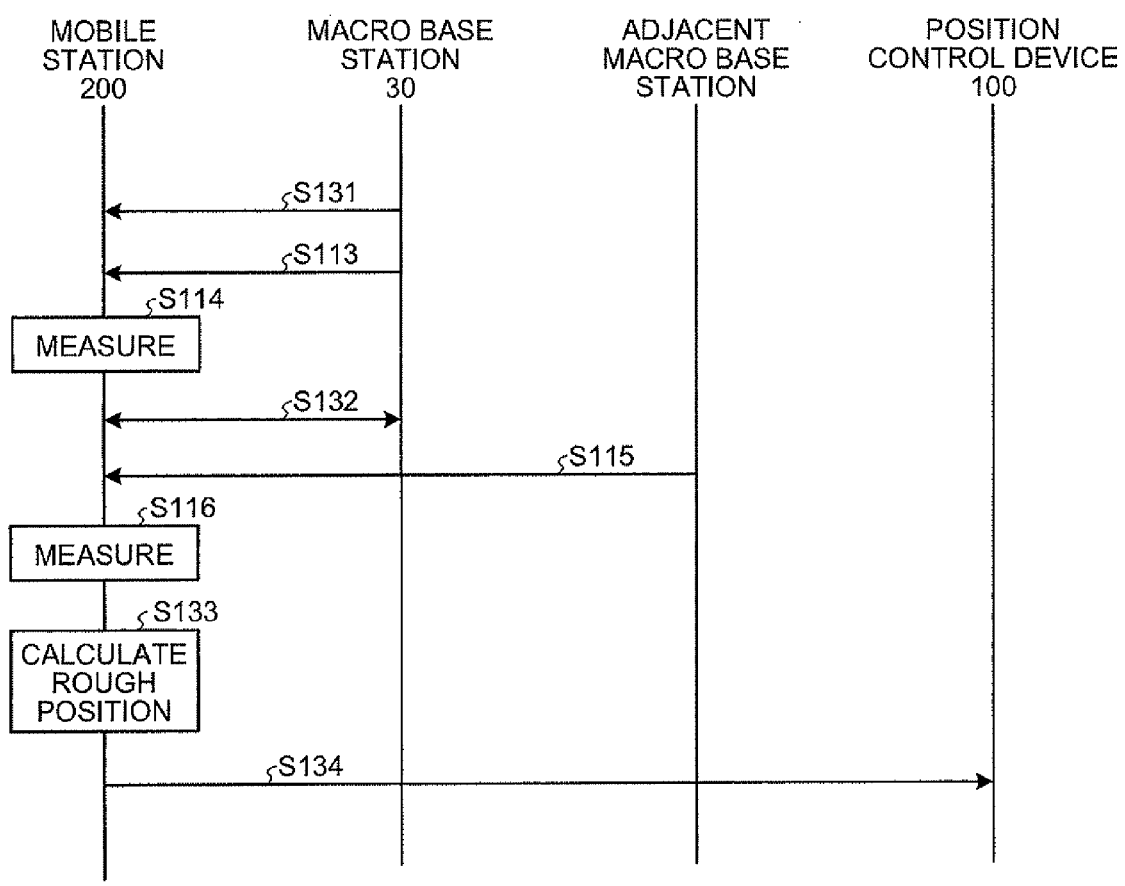
FIG. 8 is a sequence diagram of an alternative rough position acquiring process.

In the process of the third type illustrated in FIG. 8, the mobile station 200 measures the radio wave intensity of the reference signals transmitted from the macro base stations, calculates a rough position of the mobile station 200 based on the measurement results, and notifies to the position control device 100. In FIG. 8, the same portions as those in FIG. 6 are denoted by the same reference numerals.

As illustrated in FIG. 8, the macro base station 30 periodically transmits a message to notify the coordinates of the macro base station 30 and the adjacent macro base station (Step S131). Accordingly, the mobile station 200 identifies the coordinates of the macro base station 30 which is in communication and the adjacent macro base station. The mobile station 200, on receiving a known reference signal transmitted from the macro base station 30 (Step S113), measures the radio wave intensity (Step S114).

The mobile station 200, after performing message transmission/reception to disconnect communication with the macro base station 30 (Step S132), receives a known reference signal transmitted from the adjacent macro base station (Step S115), and measures the radio wave intensity (Step S116). The mobile station 200 then calculates a rough position of the mobile station 200 based on the measurement result of the radio wave intensity (Step S133), and transmits the rough position information to the position control device 100 (Step S134). The transmitted rough position information is acquired by the rough position acquiring unit 110 of the position control device 100.

By any of the three types of process, the rough position acquiring unit 110 of the position control device 100 can identify the approximate position of the mobile station 200, and the femto base station selecting unit 130 can select the femto base station 40 placed near the mobile station 200. The process to identify the approximate position of the mobile station 200 performed by the rough position acquiring unit 110 is not limited to the three types of process, but may be any optional processes. For example, simply the range of macro cell of the macro base station 30 in communication may be used as the approximate position of the mobile station 200. In particular, when the macro base station 30 performs directional transmission, it is possible to specify the rough position of the mobile station 200 to a range narrower than the macro cell. It is also possible to use, for example, a global positioning system (GPS) that uses radio wave transmitted from satellites. For example, if an inexpensive receiving circuit is employed in the mobile station 200 that receives the radio wave from the satellites, the mobile station 200 may only acquire a rough position.

Figure 9:
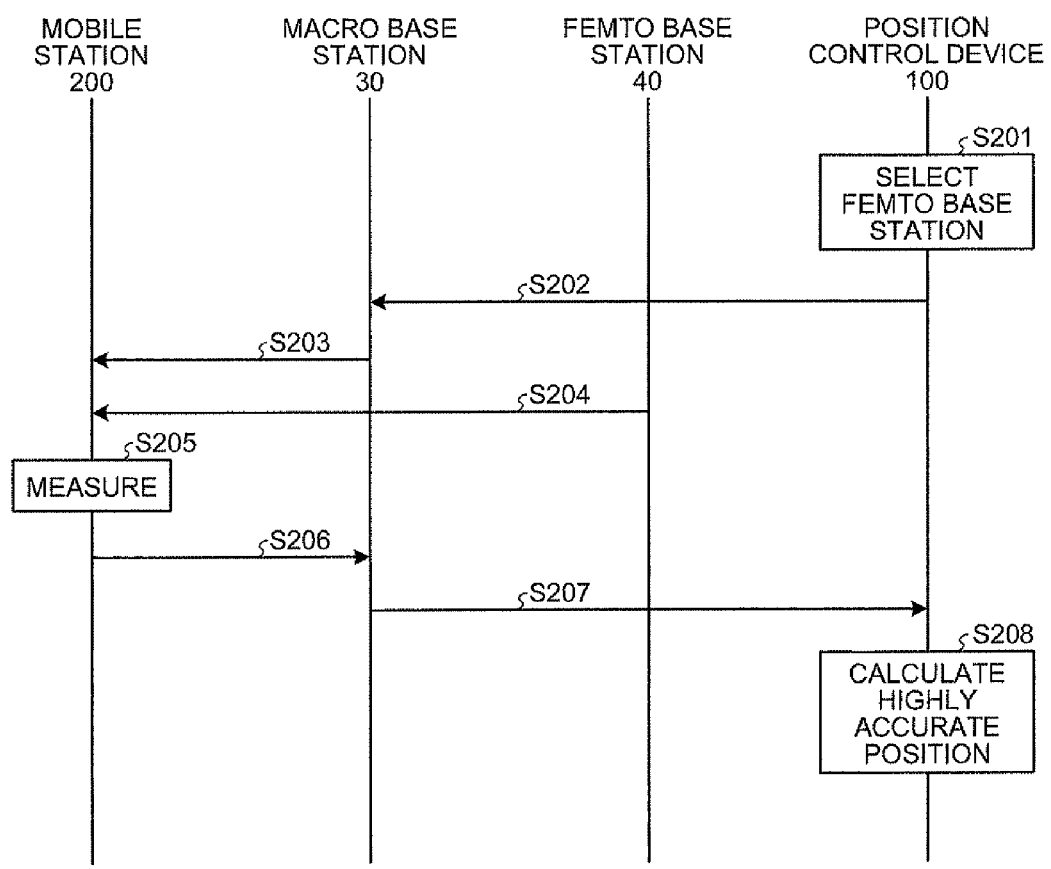
FIG. 9 is a sequence diagram of the position detection method according to the first embodiment.

A position detection method performed after obtaining the rough position of the mobile station 200 will now be described with reference to a sequence diagram illustrated in FIG. 9. FIG. 9 is a sequence diagram of a procedure performed at Steps S102 to S105 depicted in FIG. 5.

When the rough position acquiring unit 110 of the position control device 100 acquires the rough position of the mobile station 200, the femto base station selecting unit 130 selects a femto base station placed near the mobile station 200 (Step S201). More specifically, the femto base station selecting unit 130 refers to the coordinates of each of the femto base stations stored in the coordinate storage unit 120, and selects the femto base station 40 within a predetermined range based on the rough position of the mobile station 200. The identifier of the selected femto base station 40 is notified to the information transmitting unit 140, and the information transmitting unit 140 transmits a measurement request message including the identifier of the femto base station 40, and the parameter required for the reception of the reference signal transmitted from the femto base station 40, to the macro base station 30 (Step S202).

The transmitted measurement request message is transferred to the mobile station 200 from the macro base station 30 (Step S203), and received by the information receiving unit 210 of the mobile station 200. More specifically, for example, the measurement request message may be superimposed on a scan message that instructs to scan radio waves transmitted from a base station other than the base station being in communication. For example, in WiMAX, a scan response (SCN-RSP) message corresponds to the scan message.

The identifier of the femto base station 40 and the parameters included in the measurement request message are output to the reception setting unit 220, and the reception setting unit 220 performs reception setting so that the reference signal transmitted from the femto base station 40 can be received. More specifically, for example, the reception setting unit 220 sets a reception frequency or a reception timing of the reference signal receiving unit 230 to the frequency or the timing of the reference signal transmitted from the femto base station 40.

When the reference signal is transmitted from the femto base station 40, because the reception setting of the reference signal receiving unit 230 is performed by the reception setting unit 220, the reference signal is received by the reference signal receiving unit 230 of the mobile station 200 (Step S204). The radio wave intensity measuring unit 240 then measures the radio wave intensity of the received reference signal (Step S205), and the measurement result transmitting unit 250 transmits the measurement result of the radio wave intensity to the macro base station 30 (Step S206).

The transmitted measurement result of the radio wave intensity is transferred to the position control device 100 from the macro base station 30 (Step S207), and received by the measurement result receiving unit 150 of the position control device 100. The measurement result is then output to the high accuracy position calculating unit 160, and the high accuracy position calculating unit 160 calculates a highly accurate position of the mobile station 200 (Step S208). At this time, the measurement result of the radio wave intensity at the rough position acquiring process performed by the rough position acquiring unit 110 may also be used at the same time. In other words, the high accuracy position calculating unit 160 may calculate a highly accurate position of the mobile station 200, by using the measurement result of the radio wave intensity exchanged between the macro base station 30 and the mobile station 200 at the same time.

In other words, the high accuracy position calculating unit 160 not only uses the measurement result of the radio wave intensity of the reference signal transmitted from the femto base station 40, but also uses the measurement result of the radio wave intensity of the reference signal exchanged between the other base station and the mobile station 200 at the same time. Thus, it is possible to use the measurement result of the radio wave intensity of the reference signal exchanged between a femto base station other than the femto base station 40 and the mobile station 200. In this case, the high accuracy position calculating unit 160 can calculate an even more highly accurate position.

In this manner, with the present embodiment, the position control device selects a femto base station placed near the mobile station from the approximate position thereof, and notifies the selected femto base station to the mobile station. The mobile station measures the radio wave intensity of the reference signal transmitted from the notified femto base station, and the position control device calculates the position of the mobile station, by using the measurement result of the radio wave intensity. Accordingly, only the information on the femto base station that can be used for position detection is notified to an individual mobile station, and the precise position of the mobile station can be calculated based on the measurement result of the wireless environment between the femto base station and the mobile station. In brief, while preventing unnecessary consumption of wireless resources, it is possible to detect a highly accurate position of the mobile station.

In the first embodiment, the position control device 100 calculates the highly accurate position of the mobile station 200, based on the measurement result of the radio wave intensity. However, the mobile station 200 may calculate the highly accurate position of the mobile station 200, based on the measurement result of the radio wave intensity, or the macro base station 30 may calculate the highly accurate position of the mobile station 200, based on the measurement result of the radio wave intensity.

[b] Second Embodiment

The characteristics of a second embodiment of the present invention are that the mobile station transmits a reference signal to a selected femto base station, and the femto base station measures the radio wave intensity of the reference signal.

Figure 10:
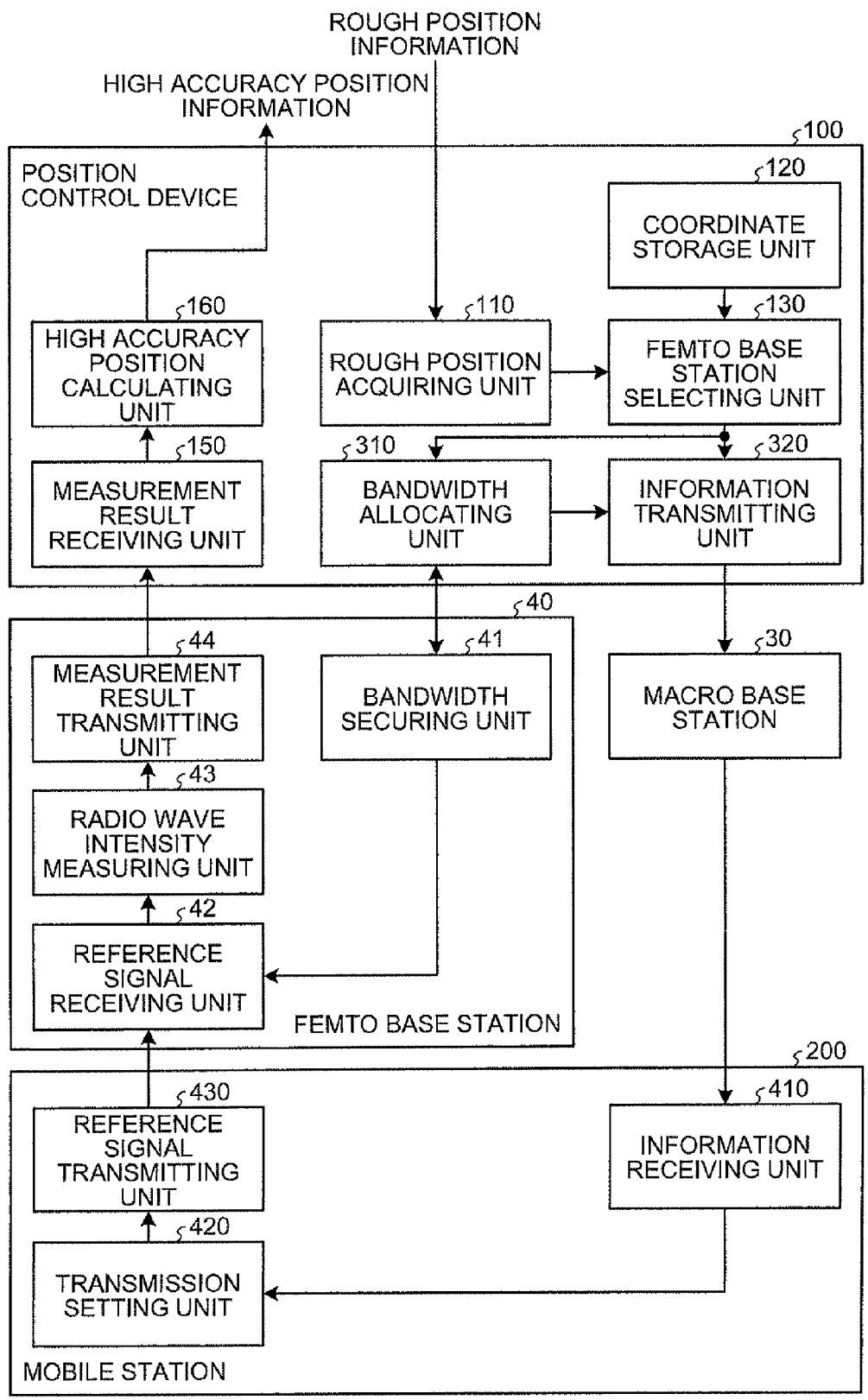
FIG. 10 is a block diagram of a main portion of a position detection system according to a second embodiment of the present invention.

FIG. 10 is a block diagram of a main portion of a position detection system that includes the position control device 100 and the mobile station 200 according to the second embodiment. In FIG. 10, the same portions as those in FIG. 3 are denoted by the same reference numerals, and the descriptions thereof are not repeated. In the following, it is assumed that the mobile station 200 is in communication with the macro base station 30, and the femto base station 40 is placed near the mobile station 200. However, the present invention is not limited to this, and for example, the mobile station 200 may be in communication with a femto base station other than the femto base station 40.

The position control device 100 illustrated in FIG. 10 includes an information transmitting unit 320 instead of the information transmitting unit 140 in the position control device 100 illustrated in FIG. 3, and a newly added bandwidth allocating unit 310.

The bandwidth allocating unit 310 instructs the femto base station 40 selected by the femto base station selecting unit 130, to secure a bandwidth (such as frequency and transmission timing) to receive a reference signal transmitted from the mobile station 200. The bandwidth allocating unit 310, when the femto base station 40 secures the bandwidth, notifies the secured bandwidth to the information transmitting unit 320.

The information transmitting unit 320 transmits information on the femto base station 40 selected by the femto base station selecting unit 130, to the mobile station 200 via the macro base station 30. More specifically, the information transmitting unit 320 transmits a measurement request message including an identifier of the selected femto base station 40, a preamble index required for synchronization with the femto base station 40, and a bandwidth which the femto base station 40 has secured to receive the reference signal. The measurement request message is delivered to the mobile station 200 via the macro base station 30 with which the mobile station 200 is in communication.

In the second embodiment, to let the femto base station 40 with which the mobile station 200 is not in communication, receive a reference signal transmitted from the mobile station 200, the bandwidth allocating unit 310 makes the femto base station 40 secure a bandwidth for receiving the reference signal in advance. The information transmitting unit 320 notifies the secured bandwidth to the mobile station 200.

The mobile station 200 illustrated in FIG. 10 includes an information receiving unit 410, a transmission setting unit 420, and a reference signal transmitting unit 430.

The information receiving unit 410 receives information on the femto base station 40 from the position control device 100 via the macro base station 30. More specifically, the information receiving unit 410 receives a measurement request message including an identifier of the femto base station 40, a preamble index required for synchronization with the femto base station 40, a frequency of a reference signal transmitted from the femto base station 40, and a bandwidth which the femto base station 40 has secured to receive the reference signal.

The transmission setting unit 420, when the information receiving unit 410 receives the measurement request message, performs transmission setting so that the reference signal can be transmitted to the femto base station 40. More specifically, the transmission setting unit 420, for example, establishes synchronization with the femto base station 40, and sets a transmission frequency and a transmission timing in the reference signal transmitting unit 430 to the bandwidth which the femto base station 40 has secured to receive the reference signal.

The reference signal transmitting unit 430 transmits the reference signal to the femto base station 40. In the second embodiment, the reference signal is a known signal in the femto base station 40 and the mobile station 200. As a specific reference signal, a ranging code may be used, for example. For example, if the communication system according to the second embodiment is employing an orthogonal frequency division multiple access (OFDMA) system, a ranging code obtained by binary phase shift keying (BPSK) modulating a code randomly selected from 256 types of 144-bit long pseudo noise (PN) may be used as the reference signal.

The femto base station 40 illustrated in FIG. 10 includes a bandwidth securing unit 41, a reference signal receiving unit 42, a radio wave intensity measuring unit 43, and a measurement result transmitting unit 44.

The bandwidth securing unit 41, when the bandwidth allocating unit 310 of the position control device 100 instructs to secure a bandwidth, secures a bandwidth to receive a reference signal transmitted from the mobile station 200. The bandwidth securing unit 41 then sets the secured bandwidth in the reference signal receiving unit 42, and notifies the bandwidth allocating unit 310 of the position control device 100 that the bandwidth is secured.

The reference signal receiving unit 42 receives the reference signal transmitted from the mobile station 200, because the bandwidth is appropriately set by the bandwidth securing unit 41. In other words, the reference signal receiving unit 42, even if the mobile station 200 is not a communication partner of the femto base station 40 with which transmission/reception of user data and the like is performed, receives the reference signal transmitted from the mobile station 200. Accordingly, even if the femto base station 40 is a femto base station that can only used by a specific user such as an owner of the femto base station, the reference signal transmitted from the mobile station 200 used by a user other than the specific user is received by the femto base station 40.

The radio wave intensity measuring unit 43 measures the radio wave intensity of the reference signal received by the reference signal receiving unit 42. The radio wave intensity measuring unit 43 then outputs the measurement result of the radio wave intensity to the measurement result transmitting unit 44.

The measurement result transmitting unit 44 transmits the measurement result of the radio wave intensity output from the radio wave intensity measuring unit 43 to the position control device 100. The measurement result of the radio wave intensity transmitted from the measurement result transmitting unit 44 is received by the measurement result receiving unit 150 of the position control device 100.

Figure 11:
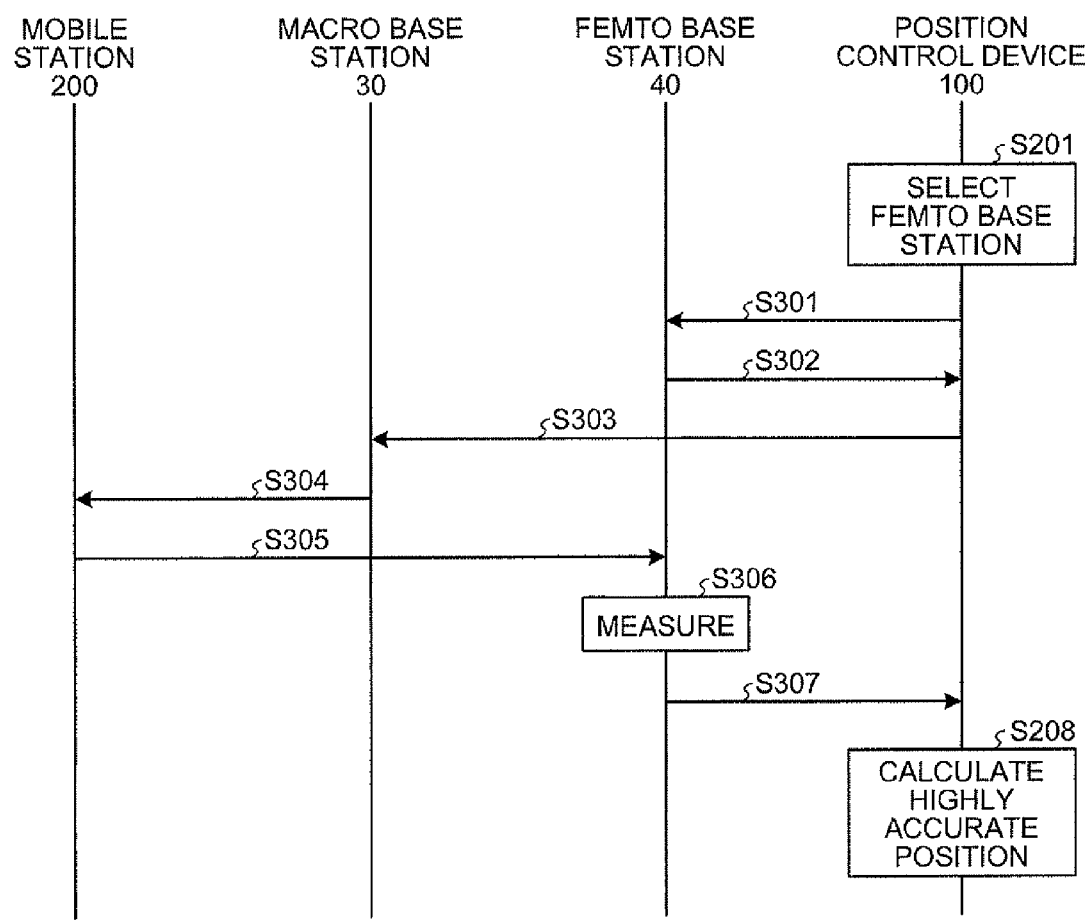
FIG. 11 is a sequence diagram of a position detection method according to the second embodiment.

A position detection method in the position detection system configured as above will now be described with reference to a sequence diagram of FIG. 11. In the second embodiment, the procedure of the position detection method is also the same as the flowchart of FIG. 5. The rough position acquiring process performed at Step S101 illustrated in FIG. 5 may be the same as that in the first embodiment. FIG. 11 is a sequence diagram of a procedure performed at Steps S102 to S105 illustrated in FIG. 5. In FIG. 11, the same portions as those in FIG. 9 are denoted by the same reference numerals, and the descriptions thereof are not repeated.

When the rough position acquiring unit 110 of the position control device 100 obtains a rough position of the mobile station 200, the femto base station selecting unit 130 selects a femto base station placed near the mobile station 200 (Step S201). An identifier of the selected femto base station 40 is notified to the bandwidth allocating unit 310 and the information transmitting unit 320, and the bandwidth allocating unit 310 allocates a bandwidth for receiving the reference signal in the femto base station 40. In other words, when the bandwidth allocating unit 310 transmits a bandwidth allocating request to the femto base station 40 (Step S301), the bandwidth securing unit 41 of the femto base station 40 secures a bandwidth for receiving the reference signal transmitted from the mobile station 200.

In the femto base station 40, when the bandwidth securing unit 41 secures the bandwidth, the secured bandwidth is set as a receiving frequency and a receiving timing of the reference signal receiving unit 42. In this manner, the secured bandwidth will not be used for communication with the other mobile stations than the mobile station 200, and can be used for receiving the reference signal transmitted from the mobile station 200 without fail. The secured bandwidth is also notified to the bandwidth allocating unit 310 of the position control device 100 from the bandwidth securing unit 41 (Step S302).

The bandwidth secured by the femto base station 40 is notified to the information transmitting unit 320 from the bandwidth allocating unit 310. The information transmitting unit 320 then transmits a measurement request message including an identifier of the femto base station 40, a parameter required for transmission of a reference signal to the femto base station 40, and a bandwidth secured by the femto base station 40 to the macro base station 30 (Step S303).

The transmitted measurement request message is transferred to the mobile station 200 from the macro base station 30 (Step S304), and received by the information receiving unit 410 of the mobile station 200. The identifier of the femto base station 40, the parameters, and the secured bandwidth included in the measurement request message are output to the transmission setting unit 420, and the transmission setting unit 420 then performs transmission setting so that the reference signal can be transmitted to the femto base station 40. More specifically, the transmission setting unit 420 sets, for example, a transmission frequency or a transmission timing in the reference signal transmitting unit 430 to the bandwidth secured by the femto base station 40.

After the transmission setting unit 420 performs transmission setting of the reference signal transmitting unit 430, the reference signal transmitting unit 430 transmits the reference signal to the femto base station 40 (Step S305). The reference signal receiving unit 42 of the femto base station 40 then receives the transmitted reference signal. The radio wave intensity measuring unit 43 then measures the radio wave intensity of the received reference signal (Step S306), and the measurement result transmitting unit 44 transmits the measurement result of the radio wave intensity to the position control device 100 (Step S307).

When the measurement result receiving unit 150 of the position control device 100 receives the transmitted measurement result of the radio wave intensity, the measurement result is output to the high accuracy position calculating unit 160. The high accuracy position calculating unit 160 then calculates a highly accurate position of the mobile station 200 (Step S208).

In this manner, with the second embodiment, the position control device selects a femto base station placed near the mobile station from the approximate position thereof, and notifies the selected femto base station to the mobile station. The mobile station transmits a reference signal to the notified femto base station, and the femto base station measures the radio wave intensity of the reference signal. The position control device then calculates the position of the mobile station by using the measurement result of the radio wave intensity. Accordingly, it is possible to notify the information only on the femto base station that can be used for position detection to an individual mobile station, and calculate the precise position of the mobile station based on the measurement result of the wireless environment between the femto base station and the mobile station. In other words, while preventing unnecessary consumption of wireless resources, it is possible to detect the highly accurate position of the mobile station. The processing load of the mobile station can be reduced, because the base station measures the radio wave intensity of the reference signal.

In the second embodiment, the position control device 100 calculates the highly accurate position of the mobile station 200, based on the measurement result of the radio wave intensity. Alternatively, however, the femto base station 40 may calculate the highly accurate position of the mobile station 200 based on the measurement result of the radio wave intensity.

[c] Third Embodiment

In the first and the second embodiments, only the position of the mobile station 200 is detected. However, the positions of more than one mobile station may be detected at the same time. The characteristics of a third embodiment of the present invention are to broadcast invariant parameters for the femto base station while detecting the positions of the mobile stations.

Figure 12:
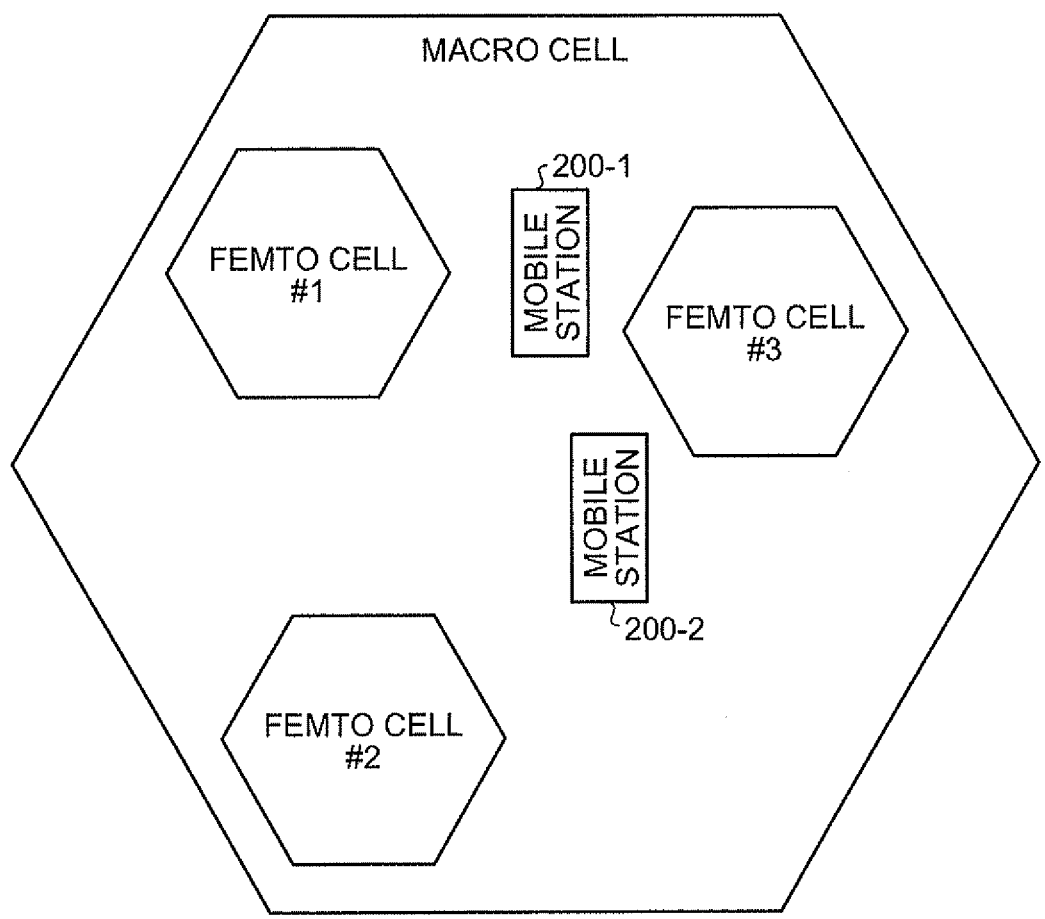
FIG. 12 is a schematic of a positional relationship of mobile stations according to a third embodiment of the present invention.

FIG. 12 is a schematic of a positional relationship between mobile stations 200-1 and 200-2 according to the present embodiment. As illustrated in FIG. 12, the mobile stations 200-1 and 200-2 are positioned in the same macro cell. Accordingly, the mobile stations 200-1 and 200-2 are both in communication with a macro base station 30a set at the center of the macro cell. A femto cell #1 and a femto cell #3 are placed near the mobile station 200-1, and a femto cell #2 and the femto cell #3 are placed near the mobile station 200-2. In other words, the femto cell #3 is placed near both the mobile stations 200-1 and 200-2. At the center of the femto cell #1, the femto base station 40-1 is installed, and similarly, at the centers of the femto cells #2 and #3, the femto base stations 40-2 and 40-3 are installed, respectively.

Figure 13:
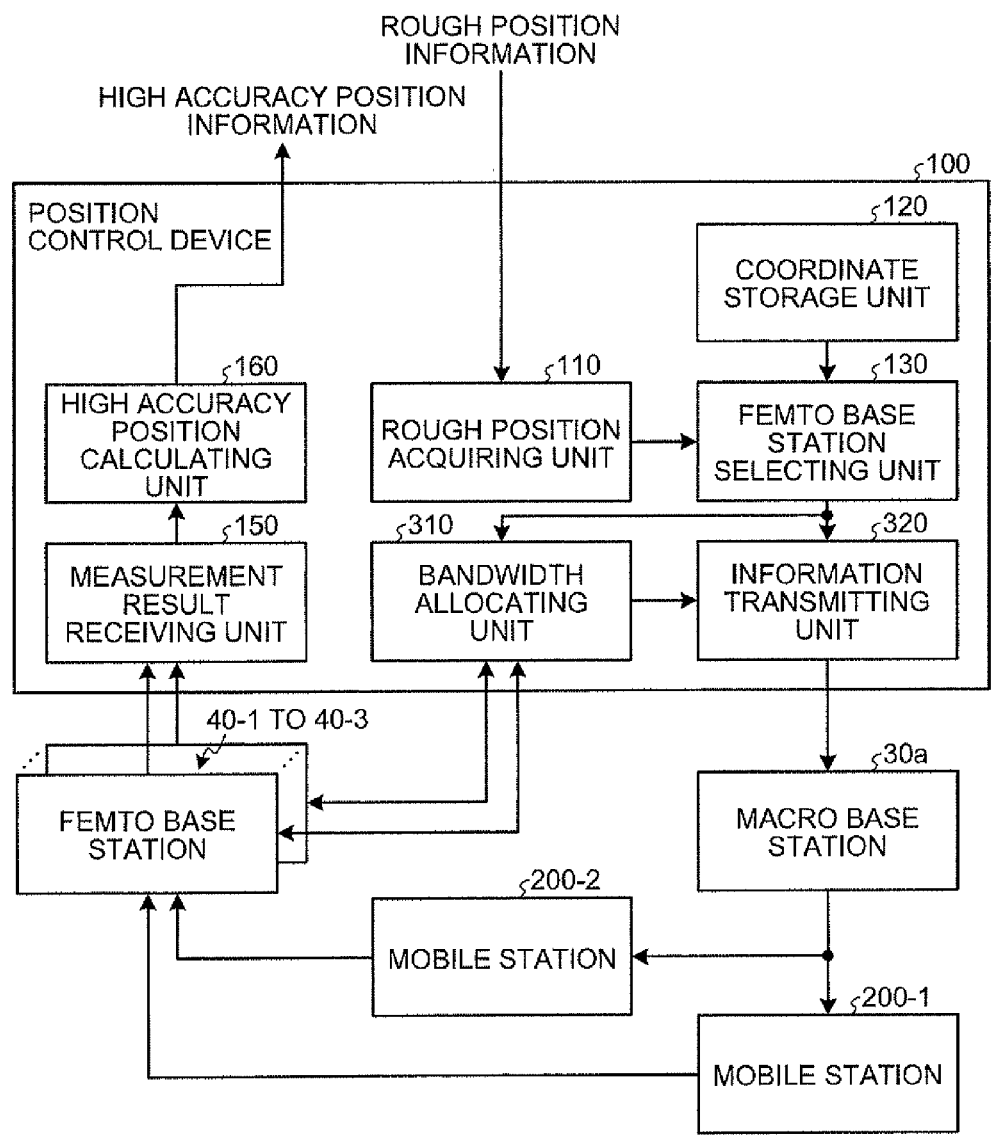
FIG. 13 is a block diagram of a main portion of a position detection system according to the third embodiment.

FIG. 13 is a block diagram of a main portion of a position detection system that includes the position control device 100 and the mobile stations 200-1 and 200-2 according to the third embodiment. In FIG. 13, the same portions as those in FIGS. 3 and 10 are denoted by the same reference numerals, and the descriptions thereof are not repeated. In the third embodiment, the configurations of the position control device 100 and the mobile stations 200-1 and 200-2 are the same as those of the position control device 100 and the mobile station 200 (FIG. 10) according to the second embodiment. However, in the third embodiment, it is assumed that the femto base stations 40-1 and 40-3 are placed near the mobile station 200-1, and the femto base stations 40-2 and 40-3 are placed near the mobile station 200-2, and the positions of the mobile stations 200-1 and 200-2 are detected substantially at the same time.

When the positions of the mobile stations 200-1 and 200-2 are to be detected, the information transmitting unit 320 of the position control device 100 transmits measurement request messages for the mobile stations 200-1 and 200-2, respectively. As described in the second embodiment, the measurement request message includes an identifier of a femto base station selected by being placed near the mobile stations, a preamble index, and a bandwidth for receiving a reference signal. The information is divided into two types: the one that should be delivered individually to the mobile stations 200-1 and 200-2, and the other that can be broadcasted in the macro cell without any problem. In other words, for example, because the bandwidth for receiving a reference signal is secured in the femto base stations for each mobile station, it is preferable that the bandwidth is delivered individually. On the other hand, for example, because a preamble index is an invariant parameter for the femto base stations, the macro cell can be broadcasted without any problem.

The macro base station 30a according to the third embodiment selects information included in the measurement request message, and transmits information that should be delivered individually to the mobile stations 200-1 to 200-2 through an individual channel. The macro base station 30a also transmits information that can be broadcasted in the macro cell without any problem through a broadcast channel. More specifically, the macro base station 30a transmits an identifier of the femto base station placed near the mobile stations 200-1 and 200-2, a bandwidth for receiving the reference signal secured by each mobile station in the femto base station, and the like, through an individual channel for each mobile station. The macro base station 30a also transmits invariant parameters such as a preamble index of each of the femto base stations 40-1 to 40-3, by broadcasting. At this time, the macro base station 30a may also broadcast invariant parameters of the femto base station, with a message that notifies the coordinates of the adjacent macro base station, a message that notifies an identifier of the adjacent macro base station, or the like.

In this manner, the common information to be notified to the mobile stations 200-1 and 200-2 can be delivered through a broadcast channel. Accordingly, the information having the same contents does not need to be delivered through a separate individual channel. As a result, it is possible to prevent unnecessary consumption of wireless resources.

Figure 14:
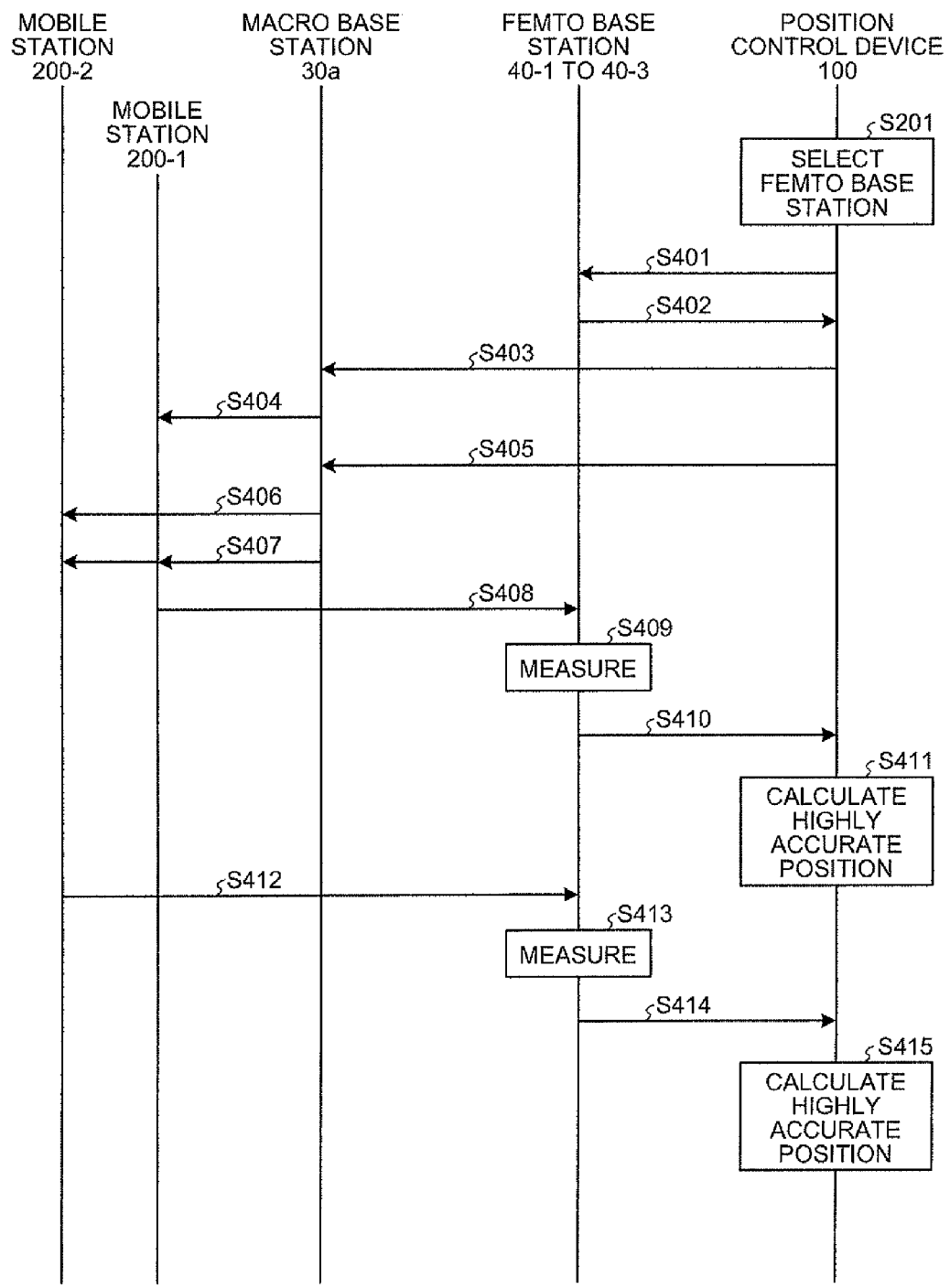
FIG. 14 is a sequence diagram of a position detection method according to the third embodiment.

A position detection method in the position detection system configured as above will now be described with reference to a sequence diagram of FIG. 14. In the third embodiment, the procedure of the position detection method is also the same as the flowchart of FIG. 5. The rough position acquiring process performed at Step S101 illustrated in FIG. 5 may be the same as that in the first embodiment. FIG. 14 is a sequence diagram of a procedure performed at Steps S102 to S105 illustrated in FIG. 5. In FIG. 14, the same portions as those in FIG. 9 are denoted by the same reference numerals, and the detailed descriptions thereof are not repeated.

When the rough position acquiring unit 110 of the position control device 100 acquires rough positions of the mobile stations 200-1 and 200-2, the femto base station selecting unit 130 selects femto base stations placed near the mobile stations 200-1 and 200-2 (Step S201). In this example, the femto base stations 40-1 and 40-3 are selected for the mobile station 200-1, and the femto base stations 40-2 and 40-3 are selected for the mobile station 200-2. The identifiers of the selected femto base stations 40-1 to 40-3 are notified to the bandwidth allocating unit 310 and the information transmitting unit 320, and the bandwidth allocating unit 310 allocates bandwidths for receiving a reference signal in the femto base stations 40-1 to 40-3. In other words, when the bandwidth allocating unit 310 transmits a bandwidth allocating request to the femto base stations 40-1 to 40-3 (Step S401), the femto base stations 40-1 to 40-3 secure bandwidths for receiving reference signals transmitted from the mobile stations 200-1 and 200-2. At this time, particularly in the femto base station 40-3, different bandwidths are secured for the mobile stations 200-1 and 200-2.

When bandwidths are secured by the femto base stations 40-1 to 40-3, the secured bandwidths are set as receiving frequencies and receiving timings of the reference signals from the mobile stations 200-1 and 200-2. Accordingly, the secured bandwidths will not be used for communication with the other mobile stations than the mobile stations 200-1 and 200-2, whereby the secured bandwidths can be used for the reception of the reference signals transmitted from the mobile stations 200-1 and 200-2 without fail. The bandwidths secured for the mobile stations 200-1 and 200-2 are notified to the bandwidth allocating unit 310 of the position control device 100 (Step S402).

The bandwidths secured by the femto base stations 40-1 to 40-3 are notified to the information transmitting unit 320 from the bandwidth allocating unit 310, and the information transmitting unit 320 transmits a measurement request message for the mobile station 200-1 to the macro base station 30a (Step S403). The measurement request message includes identifiers of the femto base stations 40-1 and 40-3, a parameter required for transmission of a reference signal to the femto base stations 40-1 and 40-3, bandwidths secured in the femto base stations 40-1 and 40-3, and the like.

The transmitted measurement request message is received by the macro base station 30a, and information that should be delivered individually to the mobile station 200-1 among the information included in the measurement request message is transmitted from the macro base station 30a, through an individual channel (Step S404). More specifically, the identifiers of the femto base stations 40-1 and 40-3, the secured bandwidths, and the like are transmitted to the mobile station 200-1.

In the position control device 100, the information transmitting unit 320 transmits a measurement request message for the mobile station 200-2 to the macro base station 30a (Step S405). The measurement request message includes identifiers of the femto base stations 40-2 and 40-3, a parameter required for transmission of a reference signal to the femto base stations 40-2 and 40-3, and bandwidths secured in the femto base stations 40-2 and 40-3.

The transmitted measurement request message is received by the macro base station 30a, and information that should be delivered individually to the mobile station 200-2 among the information included in the measurement request message is transmitted from the macro base station 30a, through an individual channel (Step S406). More specifically, the identifiers of the femto base stations 40-2 and 40-3, the secured bandwidths, and the like, are transmitted to the mobile station 200-2.

The information that can be commonly used by the mobile stations 200-1 and 200-2 is transmitted from the macro base station 30a, through a broadcast channel (Step S407). More specifically, invariant parameters for the femto base stations 40-1 to 40-3, such as preamble indexes of the femto base stations 40-1 to 40-3, are transmitted to the mobile stations 200-1 and 200-2 through a broadcast channel. At this time, the macro base station 30a may broadcast the invariant parameters for the femto base stations 40-1 to 40-3, by superimposing the parameters on a message that notifies the coordinates of the adjacent macro base station, a message that notifies an identifier of the adjacent macro base station, and the like. In other words, for example, in WiMAX, the invariant parameters may be broadcasted, by superimposing the parameters on a base station coordinate broadcast message (LBS-ADV: location based service advertisement) and an adjacent base station broadcast message (MOB_NBR-ADV: mobile neighbor advertisement).

The message that notifies an identifier of the adjacent macro base station is mainly used when the mobile station determines a base station to be handed over. Accordingly, if the message and the invariant parameters for the femto base stations 40-1 to 40-3 are superimposed on the same channel, the femto base stations 40-1 to 40-3 may be confused with the base station to be handed over. To prevent the problem, it is preferable that the invariant parameters for the femto base stations 40-1 to 40-3 be superimposed on a channel different from that of the message.

The mobile station 200-1 acquires information on the identifiers of the femto base stations 40-1 and 40-3, the parameters, and the secured bandwidths, from the individual channel and the broadcast channel, and performs transmission setting for the femto base stations 40-1 and 40-3 to transmit a reference signal. The mobile station 200-1 transmits a reference signal to the femto base stations 40-1 and 40-3 (Step S408), and the transmitted reference signal is received by the femto base stations 40-1 and 40-3. In each of the femto base stations 40-1 and 40-3, the radio wave intensity of the received reference signal is measured (Step S409), and the measurement results of the radio wave intensity are transmitted to the position control device 100 (Step S410). When the measurement result receiving unit 150 of the position control device 100 receives the measurement result of the transmitted radio wave intensity, the measurement result is output to the high accuracy position calculating unit 160, and the high accuracy position calculating unit 160 then calculates a highly accurate position of the mobile station 200-1 (Step S411).

The mobile station 200-2 acquires information on the identifiers of the femto base stations 40-2 and 40-3, the parameters, and the secured bandwidths, from the individual channel and the broadcast channel, and performs transmission setting to transmit a reference signal to the femto base stations 40-2 and 40-3. The mobile station 200-2 transmits the reference signal to the femto base stations 40-2 and 40-3 (Step S412), and the transmitted reference signal is received by the femto base stations 40-2 and 40-3. In each of the femto base stations 40-2 and 40-3, the radio wave intensity of the received reference signal is measured (Step S413), and the measurement result of the radio wave intensity is transmitted to the position control device 100 (Step S414). When the measurement result receiving unit 150 of the position control device 100 receives the measurement result of the transmitted radio wave intensity, the measurement result is output to the high accuracy position calculating unit 160, and the high accuracy position calculating unit 160 then calculates a highly accurate position of the mobile station 200-2 (Step S415).

In this manner, with the present embodiment, when the position control device transmits information on the femto base station selected for each of the mobile stations via the macro base station, the macro base station broadcasts the information that can be commonly used by the mobile stations. Accordingly, when the positions of the mobile stations are to be detected, the same information does not need to be delivered individually to the mobile stations. Consequently, it is possible to prevent unnecessary consumption of wireless resources.

In the third embodiment, the invariant parameters of the femto base station are broadcasted through the broadcast channel. However, the present invention is not limited to this, and for example, the invariant parameters may be multicasted through a multicast channel.

[d] Fourth Embodiment

The characteristics of a fourth embodiment of the present invention are that the mobile station autonomously selects a femto base station that can be used for position detection, measures the radio wave intensity of the reference signal transmitted from the selected femto base station, and detects the position of the mobile station.

Figure 15:
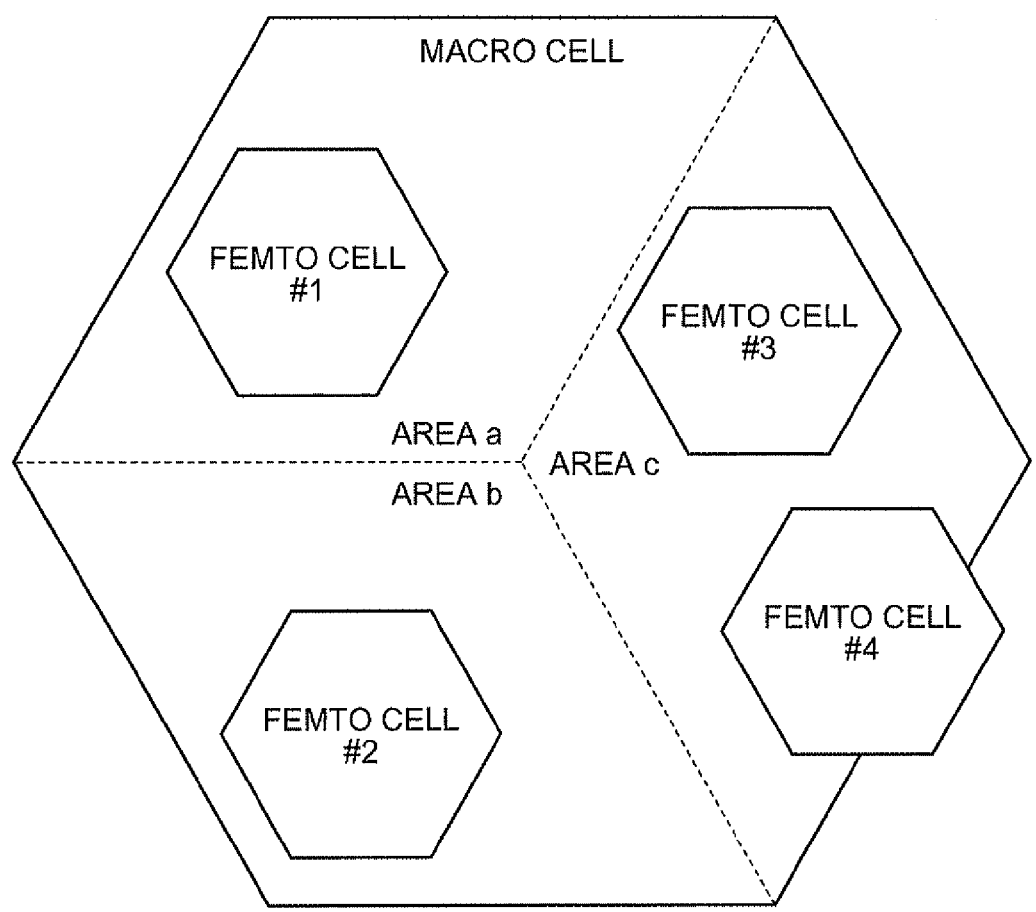
FIG. 15 is a schematic of a specific example of a cell structure according to a fourth embodiment of the present invention.

FIG. 15 is a schematic of a specific example of a cell structure according to the fourth embodiment. As illustrated in FIG. 15, in the fourth embodiment, a macro cell is further divided into three areas of a to c. The femto base station 40-1 at the center of the femto cell #1 is installed in the area a, the femto base station 40-2 at the center of the femto cell #2 is installed in the area b, and the femto base stations 40-3 and 40-4 at the center of the femto cells #3 and #4 are installed in the area c. At the center of the macro cell, it is assumed that the macro base station 30 is installed.

In the fourth embodiment, the mobile station 200 determines the area to which the mobile station 200 currently belongs based on the rough position of the mobile station 200, and selectively receives information on the femto base station in the area. The mobile station 200 then receives a reference signal from the femto base station in the area, measures the radio wave intensity, and calculates a highly accurate position of the mobile station 200.

Figure 16:
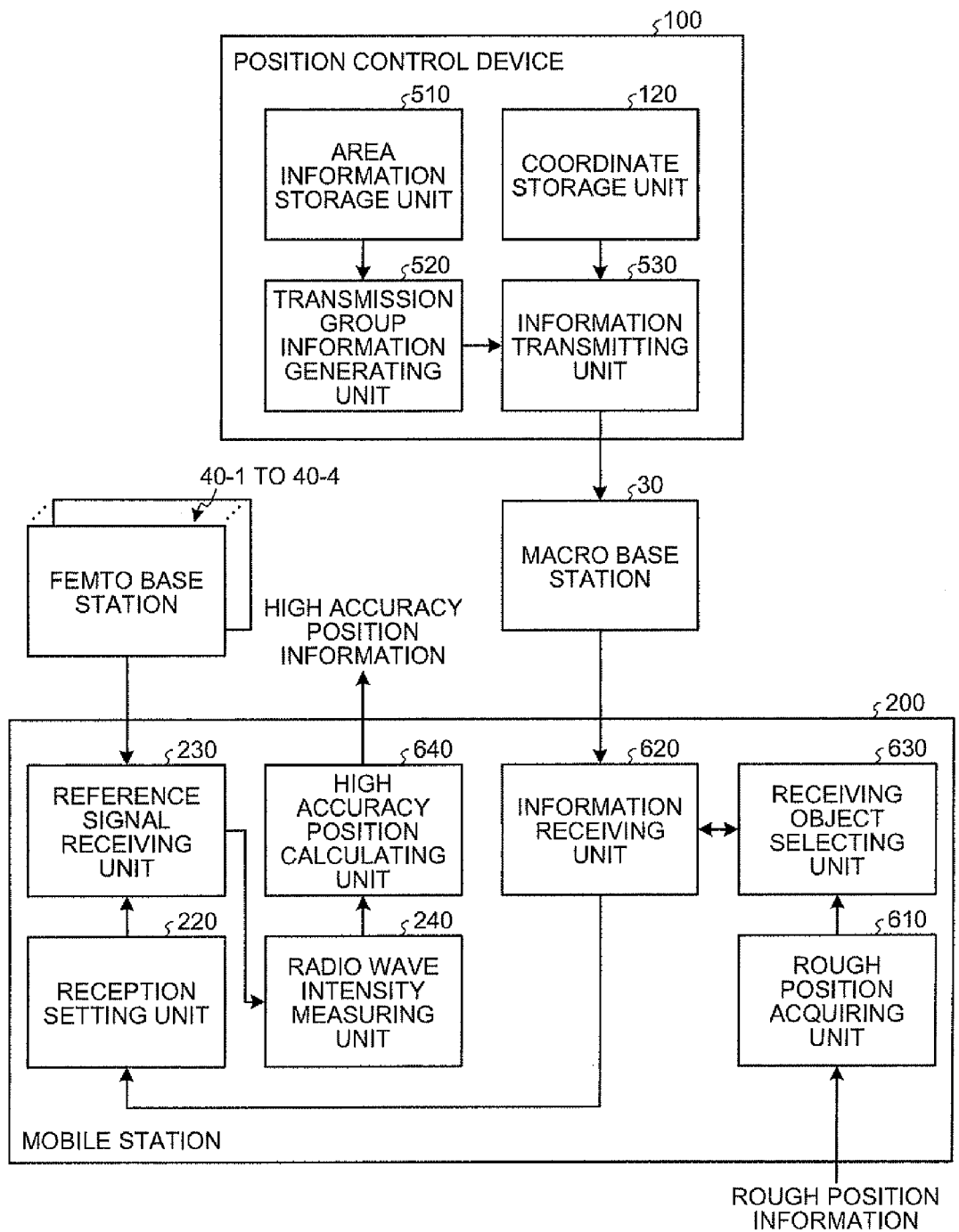
FIG. 16 is a block diagram of a main portion of a position detection system according to the fourth embodiment.

FIG. 16 is a block diagram of a main portion of a position detection system that includes the position control device 100 and the mobile station 200 according to the fourth embodiment. In FIG. 16, the same portions as those in FIG. 3 are denoted by the same reference numerals, and the descriptions thereof are not repeated. In the following, it is assumed that the mobile station 200 is in communication with the macro base station 30, and either of the femto base stations 40-1 to 40-4 is placed near the mobile station 200. However, the present invention is not limited to this, and for example, the mobile station 200 may be in communication with any one of the femto base stations including the femto base stations 40-1 to 40-4.

The position control device 100 illustrated in FIG. 16 includes the coordinate storage unit 120, an area information storage unit 510, a transmission group information generating unit 520, and an information transmitting unit 530.

Figures 17, 18:
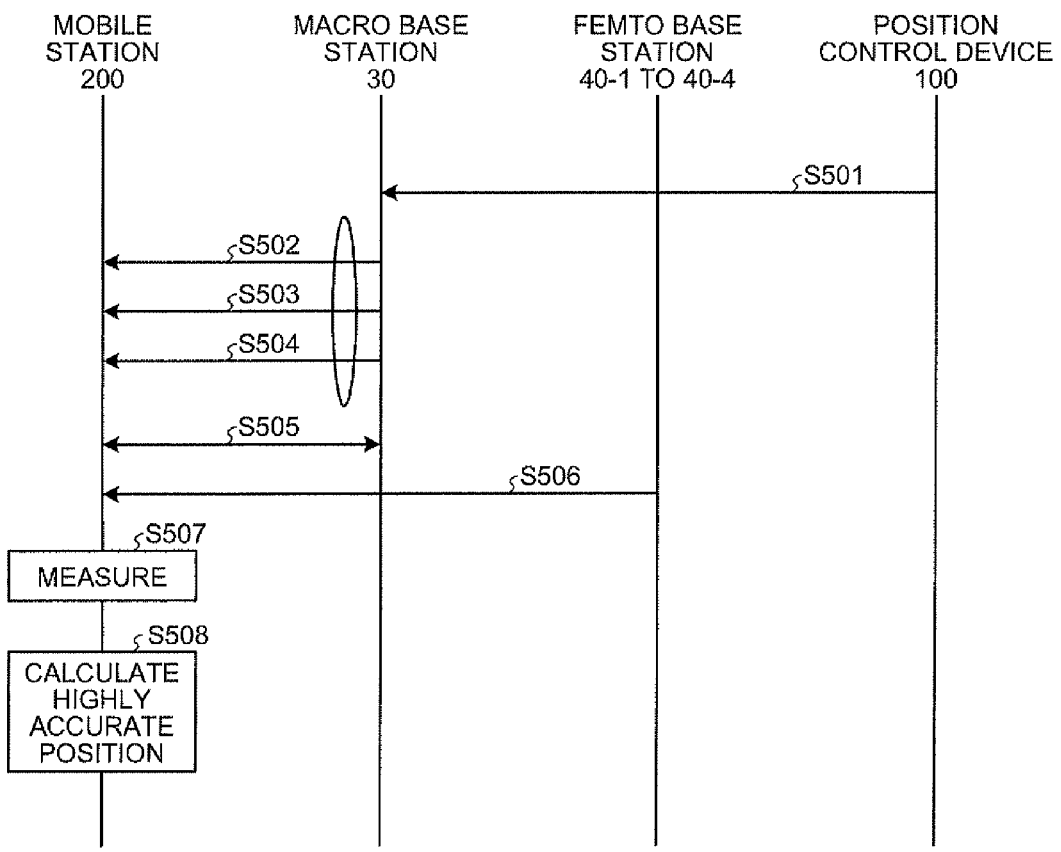
FIG. 17 is a schematic of a specific example of an area information storage unit according to the fourth embodiment.
FIG. 18 is a sequence diagram of a position detection method according to the fourth embodiment.

The area information storage unit 510 stores therein a range of areas provided by dividing the macro cells and the femto base station set in each of the areas. In other words, the area information storage unit 510, for example, as illustrated in FIG. 17, stores therein information such as three areas a to c are provided in a macro cell of the macro base station 30. The range of the area a is a distance "L1" from the macro base station 30 at the center and in a range from a start angle "Rad 1" to an end angle "Rad 2", and the femto base station 40-1 is installed therein.

The transmission group information generating unit 520 determines a transmission group of information transmitted at the same time, by combining pieces of information on the areas, from the area division condition of each macro cell stored in the area information storage unit 510. More specifically, the transmission group information generating unit 520 forms a transmission group by combining the information on the femto base station in one area and the ranges for all other areas. Accordingly, the transmission group information generating unit 520, for example, forms a transmission group by combining the information on the femto base station 40-1 in the area a, and the distance, the start angle, and the end angel of the areas b and c. The transmission group information generating unit 520 then outputs transmission group information that shows a combination of pieces of information in each of the transmission groups, to the information transmitting unit 530.

The information transmitting unit 530 acquires coordinates of the femto base station included in the transmission groups from the coordinate storage unit 120, by referring to the transmission group information output from the transmission group information generating unit 520. The information transmitting unit 530 then transmits information that combined the coordinates of the femto base station, the parameters for communication, and the range of areas in each of the transmission groups, to the macro base station 30. In other words, the information transmitting unit 530, for example, transmits the information that shows a combination of the information on the femto base station and the information on the areas corresponding to each of the transmission groups, such as a combination of the coordinates of the femto base station 40-1 in the area a, the parameters for communication, and the range of areas b and c, to the macro base station 30.

In the fourth embodiment, the macro base station 30 receives the information transmitted from the information transmitting unit 530, sequentially repeats the information on each of the transmission groups, and broadcasts in the macro cell. In other words, the macro base station 30 repeatedly transmits a combination of information on the femto base station 40-1 and information on the areas b and c, a combination of information on the femto base station 40-2 and information on the areas a and c, and a combination of information on the femto base stations 40-3 and 40-4, and information on the areas a and b, sequentially, for example. Accordingly, when each of the combinations is transmitted, the detailed information on one area and the range of remaining areas, are broadcasted in the macro cell.

In this manner, in the fourth embodiment, the macro cell is divided into a plurality of areas, and the information on the femto base station in each of the areas is broadcasted separately. Accordingly, the amount of information transmitted per broadcast can be reduced. As a result, the information on all the femto base stations in the macro cell can be broadcasted, while preventing unnecessary consumption of wireless resources.

The mobile station 200 depicted in FIG. 16 includes a rough position acquiring unit 610, an information receiving unit 620, a receiving object selecting unit 630, the reception setting unit 220, the reference signal receiving unit 230, the radio wave intensity measuring unit 240, and a high accuracy position calculating unit 640.

The rough position acquiring unit 610 calculates an approximate position of the mobile station 200, based on the transmission/reception of signals between the macro base stations including the macro base station 30 and the mobile station 200. The rough position acquiring unit 610 then notifies the approximate position of the mobile station 200 to the receiving object selecting unit 630. The rough position acquiring unit 610, for example, among the three types of the rough position acquiring process described in the first embodiment, may acquire the rough position of the mobile station 200 by the third type process (FIG. 8).

The information receiving unit 620 receives information broadcasted for each transmission group from the macro base station 30 and outputs the transmission group information including the information on the femto base station and the information on the areas, to the receiving object selecting unit 630. More specifically, the information receiving unit 620 outputs information on the femto base station in any one of the areas and information on the range of other areas to the receiving object selecting unit 630.

The information receiving unit 620, when the receiving object selecting unit 630 notifies that the transmission group information received this time is to be received, acquires an identifier of the femto base station, a preamble index required for synchronization with the femto base station, a frequency of a reference signal transmitted from the femto base station, and the like from the transmission group information received this time. The identifier, the preamble index, the frequency of the reference signal, and the like, similar to the first embodiment, are used for reception setting by the reception setting unit 220.

The receiving object selecting unit 630, when the transmission group information is output from the information receiving unit 620, selects optimum transmission group information that corresponds to the rough position of the mobile station 200, as a receiving object. In other words, the receiving object selecting unit 630, by referring to the information on the range of areas included in the transmission group information received this time by the information receiving unit 620, determines whether the mobile station 200 belongs to the areas. As a result of the determination, if the mobile station 200 does not belong to the areas, the mobile station 200 belongs to the same area as the femto base station whose identifier is included in the transmission group information received this time. In other words, the information on the femto base station included in the transmission group information received this time by the information receiving unit 620 can be used to detect the position of the mobile station 200. In this case, the receiving object selecting unit 630 notifies the information receiving unit 620 that the transmission group information received this time is to be received.

If the mobile station 200 belongs to the area corresponding to the information on the range of areas, the mobile station 200 belongs to the area different from that of the femto base station whose identifier is included in the transmission group information received this time. In other words, the transmission group information received this time by the information receiving unit 620 is not suitable for detecting the position of the mobile station 200. In this case, the receiving object selecting unit 630 instructs the information receiving unit 620 to standby until the information on different transmission group is received next time.

The high accuracy position calculating unit 640 calculates the precise position of the mobile station 200 based on the measurement result of the radio wave intensity acquired by the radio wave intensity measuring unit 240. In other words, the high accuracy position calculating unit 640 calculates the position of the mobile station 200 by using the coordinates of the base station that is the transmission source of the reference signal, and the measurement result of the radio wave intensity of the reference signal. Because the high accuracy position calculating unit 640 uses the measurement result related to the reference signal of the femto base station with a relatively narrow transmission range, the highly accurate position of the mobile station 200 can be calculated.

A position detection method in the position detection system configured as above will now be described with reference to a sequence diagram of FIG. 18. In the fourth embodiment, the procedure of the position detection method is also the same as the flowchart illustrated in FIG. 5. In the fourth embodiment, the third type process described in the first embodiment and the like can be used for the rough position acquiring process performed at Step S101 illustrated in FIG. 5. FIG. 18 is a procedure performed at Steps S102 to S105 of FIG. 5.

In the fourth embodiment, the macro cell is divided into the areas. Accordingly, the transmission group information generating unit 520 determines a transmission group by combining the information on a femto base station in one of the areas and the range of the remaining areas. The transmission group information generating unit 520 then refers to the area information storage unit 510, generates transmission group information that includes an identifier of a femto base station in one area and the range of the remaining areas, for each of the transmission groups, and outputs the transmission group information to the information transmitting unit 530. The information transmitting unit 530 notifies a combination of the information on the femto base station that belongs to one area and the information on the range of the remaining areas for each of the transmission groups to the macro base station 30 (Step S501).

With the notification, the macro base station 30 repeatedly broadcasts the information on each transmission group in the macro cell. In other words, the macro base station 30, broadcasts the information on the femto base station 40-1 in the area a and the range of areas b and c (Step S502), then broadcasts the information on the femto base station 40-2 in the area b and the range of the areas a and c (Step S503), and then broadcasts the information on the femto base stations 40-3 and 40-4 in the area c and the range of the areas a and b (Step S504), for example. The macro base station 30 repeatedly broadcasts the pieces of transmission group information in sequence. At this time, the macro base station 30 may broadcast the transmission group information by superimposing the information on a message that notifies the coordinates of the adjacent macro base station and the like.

The transmission group information transmitted from the macro base station 30 is received by the information receiving unit 620 of the mobile station 200. At this time, it is assumed that the rough position of the mobile station 200 is already acquired by the rough position acquiring unit 610 of the mobile station 200.

The transmission group information received by the information receiving unit 620 is output to the receiving object selecting unit 630, and the receiving object selecting unit 630 determines whether the transmission group information received this time is the information to be received. More specifically, the range of areas included in the transmission group information received this time is referred to in order to determine whether the mobile station 200 belongs to the areas. If the mobile station 200 does not belong to the areas, the mobile station 200 belongs to the same area as that of the femto base station whose identifier is included in the transmission group information received this time. The receiving object selecting unit 630 determines that the transmission group information received this time is to be received, and this is notified to the information receiving unit 620.

In this manner, in the fourth embodiment, the receiving object selecting unit 630 selects the transmission group information to be received. Accordingly, the femto base station used for detecting the position of the mobile station 200 is selected.

If the mobile station 200 belongs to the range of areas included in the transmission group information received this time, the mobile station 200 belongs to an area different from that of the femto base station whose identifier is included in the transmission group information received this time. Accordingly, the femto base station is not suitable for detecting the position of the mobile station 200, and the receiving object selecting unit 630 determines that the transmission group information received this time is not to be received. In this case, the receiving object selecting unit 630 instructs the information reception unit 620 to standby until the information on the next transmission group is received.

Consequently, the process is repeated until the transmission group information to be received is received by the information receiving unit 620. When the information receiving unit 620 receives the transmission group information to be received, the information on the femto base station included in the information is acquired. In other words, the information receiving unit 620 acquires an identifier of the femto base station installed in the same area as that of the mobile station 200, a preamble index, a frequency of a reference signal, and the like. Accordingly, the reception setting unit 220 performs reception setting to receive the reference signal transmitted from the femto base station, and the reference signal receiving unit 230 becomes capable of receiving the reference signal transmitted from the femto base station placed near the mobile station 200.

After message transmission/reception is performed to interrupt the communication between the mobile station 200 and the macro base station 30 (Step S505), the reference signal receiving unit 230 receives the reference signal transmitted from the femto base station (Step S506). The radio wave intensity measuring unit 240 then measures the radio wave intensity of the received reference signal (Step S507), and the high accuracy position calculating unit 640 calculates a highly accurate position of the mobile station 200 (Step S508).

In this manner, with the fourth embodiment, the macro cell is divided into the areas, and the macro base station broadcasts the information on the femto base station for each area in the macro cell. The mobile station acquires the rough position of the mobile station, and selectively receives the information on the femto base station in the area where the mobile station belongs. The mobile station then measures the radio wave intensity of the reference signal transmitted from the femto base station, and calculates the position of the mobile station by using the measurement result of the radio wave intensity. Accordingly, it is possible to broadcast the information on the femto base station while preventing unnecessary consumption of wireless resources, and the mobile station can autonomously calculate the precise position of the mobile station.

In the fourth embodiment, the transmission group is the combination of one of the areas and the remaining areas. However, the areas of the transmission group may be of any combination. In other words, the transmission group may be a combination of two areas and the remaining areas, for example, and the transmission group information generating unit 520 generates transmission group information based on the transmission group.

In the embodiments, the position of the mobile station 200 is calculated by the radio wave intensity of the reference signal. However, the present invention is not limited to this, and a measurement result of the wireless environment such as a transmission delay of the reference signal, for example, can be used to detect the position of the mobile station 200. If the transmission delay is used, the position of the mobile station 200 is calculated, by using characteristics in which the transmission delay of the reference signal increases as the distance between the mobile station 200 and the base station, which is the transmission source of the reference signal, gets longer. In the similar manner, an error rate of the received reference signal, for example, may also be used for detecting the position of the mobile station 200.

The position detection method similar to the embodiments can also be realized by generating a position detection program written in a form that a computer can execute the position detection method described in the embodiments, and by having the computer execute the position detection program. At this time, it is also possible to store the position detection program in a computer readable storage medium, and introduce the position detection program into the computer by using the storage medium.

It is possible to provide a mobile communication system and a position detection method that can accurately detect the position of a mobile station.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A mobile communication system that includes a first base station transmitting adjacent base station information and a mobile station communicating with the first base station, the mobile communication system comprising:
   a transmitting unit that repeatedly transmits, from the first base station to the mobile station, at least three pieces of area information set for a plurality of areas including a first area, a second area and a third area obtained by dividing a radio wave transmission range of the first base station, a first piece of the area information including an identifier of a base station installed in the first area and range information of other areas including the second and third areas, a second piece of the area information including an identifier of a base station installed in the second area and range information of other areas including the first and third areas, a third piece of the area information including an identifier of a base station installed in the third area and range information of other areas including the first and second areas;
   a rough position acquiring unit that acquires a rough position of the mobile station, the rough position being obtained by communication between the mobile station and the first base station;
   a selecting unit that selects, based on the at least three pieces of the area information repeatedly transmitted by the transmitting unit, one or more base stations whose information is not included in the adjacent-base-station information but included in a piece of the area information set for one of the areas to which the rough position obtained by the rough position acquiring unit belongs, when the rough position does not belong to ranges of the other areas indicated by the range information included in the piece of the area information; and a position detecting unit that, by using the one or more base stations selected by the selecting unit, detects a position of the mobile station.

2. The mobile communication system according to claim 1, wherein the mobile station includes a wireless communicating unit that performs wireless communication with the one or more base stations, based on information on the one or more base stations.

3. The mobile communication system according to claim 2, wherein the mobile station performs wireless communication with the one or more base stations, using the wireless communicating unit, by using a bandwidth for receiving a known signal, the bandwidth being secured by the one or more base stations.

4. The mobile communication system according to claim 1, wherein a wireless zone, in which the one or more base stations operate, is relatively smaller than a wireless zone in which the first base station operates.

5. The mobile communication system according to claim 1, wherein the first base station forms a macro cell, and the one or more base stations form a femto cell.

6. A method for detecting a position of a mobile station in a mobile communication system that includes a first base station transmitting adjacent base station information and communicating with the mobile station, the method comprising:

repeatedly transmitting, from the first base station to the mobile station, at least three pieces of area information set for a plurality of areas including a first area, a second area and a third area obtained by dividing a radio wave transmission range of the first base station, a first piece of the area information including an identifier of a base station installed in the first area and range information of other areas including the second and third areas, a second piece of the area information including an identifier of a base station installed in the second area and range information of other areas including the first and third areas, a third piece of the area information including an identifier of a base station installed in the third area and range information of other areas including the first and second areas;

acquiring a rough position of the mobile station, the rough position being obtained by communication between the mobile station and the first base station;

selecting, based on the at least three pieces of the area information repeatedly transmitted, one or more base stations whose information is not included in the adjacent-base-station information but included in a piece of the area information set for one of the areas to which the rough position acquired at the acquiring belongs, when the rough position does not belong to ranges of the other areas indicated by the range information included in the piece of the area information; and detecting a position of the mobile station, by using the one or more base stations selected at the selecting.

* * * * *